US011188983B1

(12) United States Patent
Joshi et al.

(10) Patent No.: US 11,188,983 B1
(45) Date of Patent: Nov. 30, 2021

(54) COMPUTER SYSTEMS, METHODS AND USER-INTERFACES FOR TRACKING AN INVESTOR'S UNIQUE SET OF SOCIAL AND ENVIRONMENTAL PREFERENCES

(71) Applicant: Morgan Stanley Services Group Inc., New York, NY (US)

(72) Inventors: Kshitija Joshi, New York, NY (US); Courtney Thompson, New York, NY (US); James W. Martin, New York, NY (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 69 days.

(21) Appl. No.: 16/778,758

(22) Filed: Jan. 31, 2020

Related U.S. Application Data

(60) Provisional application No. 62/893,984, filed on Aug. 30, 2019.

(51) Int. Cl.
*G06Q 40/06* (2012.01)
*G06Q 30/00* (2012.01)
*G06F 16/26* (2019.01)
*G06Q 10/06* (2012.01)
*G06Q 50/06* (2012.01)

(52) U.S. Cl.
CPC ............ *G06Q 40/06* (2013.01); *G06F 16/26* (2019.01); *G06Q 10/0637* (2013.01); *G06Q 30/018* (2013.01); *G06Q 50/06* (2013.01)

(58) Field of Classification Search
CPC ............ G06Q 10/00–50/00; G06F 1/00–21/00
USPC ................................................ 705/7.11–7.42
See application file for complete search history.

(56) References Cited

U.S. PATENT DOCUMENTS

| 7,454,377 B1 * | 11/2008 | Beaumont | G06Q 40/00 703/2 |
| 7,596,525 B1 * | 9/2009 | Repetto | G06Q 40/04 705/36 R |
| 7,636,681 B2 * | 12/2009 | Margolis | G06Q 40/00 705/36 R |

(Continued)

OTHER PUBLICATIONS

Hallerbach, Winfried, et al. "A framework for managing a portfolio of socially responsible investments." European Journal of Operational Research 153.2 (2004): 517-529. (Year: 2004).*

*Primary Examiner* — Alan S Miller

(57) ABSTRACT

Computer-based systems and methods produce output graphics and displays for financial advisors following computational discovery, assessment and alignment of a client's (e.g., an investor's) holdings and accounts to the client's unique social and environmental impact preferences. The systems and methods of the present invention can (1) track a client's unique set of social and environmental impact preferences using a detailed taxonomy; (2) quantitatively assess the client's portfolio of investment holdings on the selected social and environmental impact preferences; (3) search for new investment opportunities that would better align with the client's preferences; and (4) benchmark the client's portfolio and new investment opportunities against comparable market indices and custom portfolio blends. The system uses an intuitive user-interface that allows the clients to specify the investor's social and environmental impact preferences, and that provides the benchmarking analysis and new investment opportunities.

17 Claims, 23 Drawing Sheets

(56) References Cited

U.S. PATENT DOCUMENTS

| | | | | |
|---|---|---|---|---|
| 8,566,184 | B1* | 10/2013 | Paluck | G06Q 40/06 705/30 |
| 8,620,723 | B1* | 12/2013 | Good | G06Q 30/00 705/7.34 |
| 2002/0123951 | A1* | 9/2002 | Olsen | G06Q 40/06 705/36 R |
| 2003/0018487 | A1* | 1/2003 | Young | G06Q 30/0206 705/500 |
| 2003/0177084 | A1* | 9/2003 | Cassani | G06Q 40/06 705/36 R |
| 2004/0249697 | A1 | 12/2004 | Ohnemus et al. | |
| 2006/0015425 | A1* | 1/2006 | Brooks | G06Q 40/10 705/35 |
| 2006/0089895 | A1* | 4/2006 | Joye | G06Q 40/00 705/35 |
| 2006/0100897 | A1* | 5/2006 | Halloran, Jr. | G06Q 30/0241 705/7.28 |
| 2006/0100949 | A1* | 5/2006 | Whaley | G06Q 40/06 705/36 R |
| 2008/0059457 | A1 | 3/2008 | Ohnemus et al. | |
| 2008/0162372 | A1* | 7/2008 | Margolis | G06Q 40/00 705/36 R |
| 2008/0243716 | A1* | 10/2008 | Ouimet | G06Q 40/06 705/36 R |
| 2010/0114796 | A1 | 5/2010 | Repetto et al. | |
| 2012/0116993 | A1* | 5/2012 | Ouimet | G06Q 40/06 705/36 R |
| 2012/0271669 | A1 | 10/2012 | Taper et al. | |
| 2013/0018683 | A1* | 1/2013 | Cristol | G06Q 30/02 705/7.12 |
| 2014/0279702 | A1 | 9/2014 | Douillet | |
| 2015/0095262 | A1* | 4/2015 | McIntosh | G06Q 40/06 705/36 R |
| 2016/0117774 | A1* | 4/2016 | Bateman | G06Q 40/06 705/36 R |
| 2016/0171609 | A1* | 6/2016 | Oberlechner | G06Q 30/06 705/36 R |
| 2017/0093820 | A1* | 3/2017 | Forguson | H04L 9/0825 |
| 2017/0293980 | A1* | 10/2017 | Phillips | G06Q 40/04 |
| 2018/0121519 | A1* | 5/2018 | Cook | G06F 16/2471 |
| 2018/0330446 | A1* | 11/2018 | Oesterer | G06Q 40/025 |
| 2019/0362427 | A1* | 11/2019 | Chen | G06F 40/30 |

* cited by examiner

Fig. 5

COMPUTER SYSTEMS, METHODS AND USER-INTERFACES FOR TRACKING AN INVESTOR'S UNIQUE SET OF SOCIAL AND ENVIRONMENTAL PREFERENCES

PRIORITY CLAIM

The present application claims priority to U.S. provisional patent application Ser. No. 62/893,984 filed Aug. 30, 2019, with the same title and inventors as stated above, and which is incorporated herein by reference.

BACKGROUND

Most web-based reporting platforms of financial advisors have interfaces that allow an investor to view and print breakdowns and graphics of the investor's portfolio, such as the proportions of the portfolio (in terms of market value) invested in various asset classes, the proportions of the portfolio invested in particular investments (funds or securities), the proportions of the portfolio invested in various industry sectors (tech, pharma, etc.) and markets (U.S., Japan, etc.).

Today's investors increasingly have social and environmental preferences that impact their investment choices. With currently available investing tools, however, it is difficult to understand how an investor's portfolio aligns with the investor's social and environmental preferences. Instead, presently, an investor who wishes to invest consistent with his/her unique social and environmental preferences is generally limited to selecting funds or securities that have a stated social or environmental objective and then receiving standard reports for these investments. Accordingly, present computer systems hosted by financial advisors for their clients (i.e., investors) are not capable of, for example, reporting—much less permitting the investor or his/her financial advisor to graphically visualize—how an investor's portfolio aligns with the investor's unique social and environmental preferences. Nor do present computer systems hosted by financial advisors allow investors to easily visualize how changes in the investor's portfolio will affect alignment of the portfolio with the investor's unique social and environmental preferences. These drawbacks, among others, make present-day computer systems hosted by financial advisors unsatisfactory.

SUMMARY

In one general aspect, the present invention is directed to computer-based systems and methods that allow financial advisors to discover their clients' (i.e., investors') unique social and environmental preferences (henceforth, "impact preferences") and subsequently assess and align their clients' investment portfolio(s) with those preferences. In particular, the systems and methods of the present invention can (1) track a client's unique set of impact preferences using a detailed taxonomy; (2) quantitatively assess the client's portfolio of investment holdings on the selected impact preferences; (3) search for new investment opportunities that would better align the client's portfolio with the selected impact preferences; and (4) benchmark the client's portfolio and new investment opportunities against comparable market indices and custom blended indices. The invention preferably uses an intuitive user-interface that allows the users to specify the investor's impact preferences, and that provides the quantitative assessment, benchmarking analysis and new investment opportunities.

An investor's impact preferences can be complex and vast (e.g., hundreds of preferences). Various instantiations of the present invention importantly solve the challenge of taking these hundreds of preferences and data points and allowing, for example, a financial advisor to distill down to the components most meaningful to each investor/client. Importantly, these preferences are wholly unique to each client (i.e., investor) and can vary across individuals, families, households, and institutions. The invention, in various embodiments, can also improve the alignment of the client's portfolio with his/her unique impact preferences by identifying hypothetical investment changes across each of the unique preferences determined by the client.

These and other benefits realizable through the present invention will be apparent from the description below.

BRIEF DESCRIPTION OF THE DRAWINGS

Various embodiments of the present invention are described herein by way of example in connection with the following figures, wherein:

FIGS. 4 to 7 are screen shots showing alignment between an investor's investments and the investor's impact preferences according to various embodiments of the present invention;

DESCRIPTION

In one general aspect, the present invention is directed to computer-based systems and methods that allow financial advisors to discover, assess and align their clients' (i.e., investors') impact preferences in terms of the client's investments. A first step, therefore, is to discover a client's impact preferences. In one embodiment, this discovery process is performed through an online survey, hosted by the client's brokerage firm (for example), through which the client can specify his/her particular impact preferences. In various embodiments, the client's/investor's financial advisor takes the survey with the client/investor, such that the financial advisor is the user of the system. In other embodiments, the client/investor could take the survey and select their impact preferences directly.

Figure 1A:
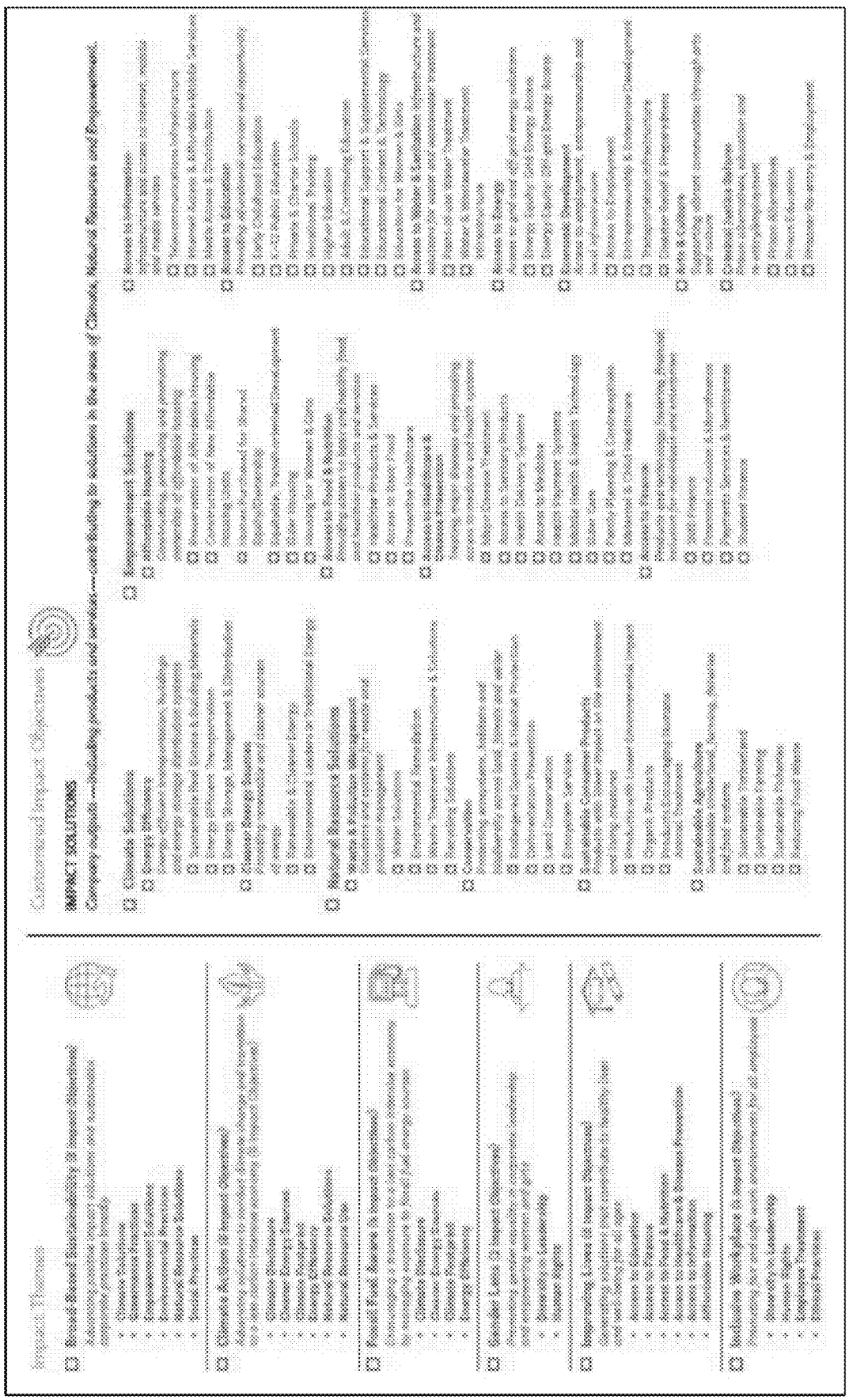
FIGS. 1A, 1B and 1C are screen shots of an exemplary online survey for collecting an investor's impact preferences according to various embodiments of the present invention.
Figure 1B:
Figure 1C:
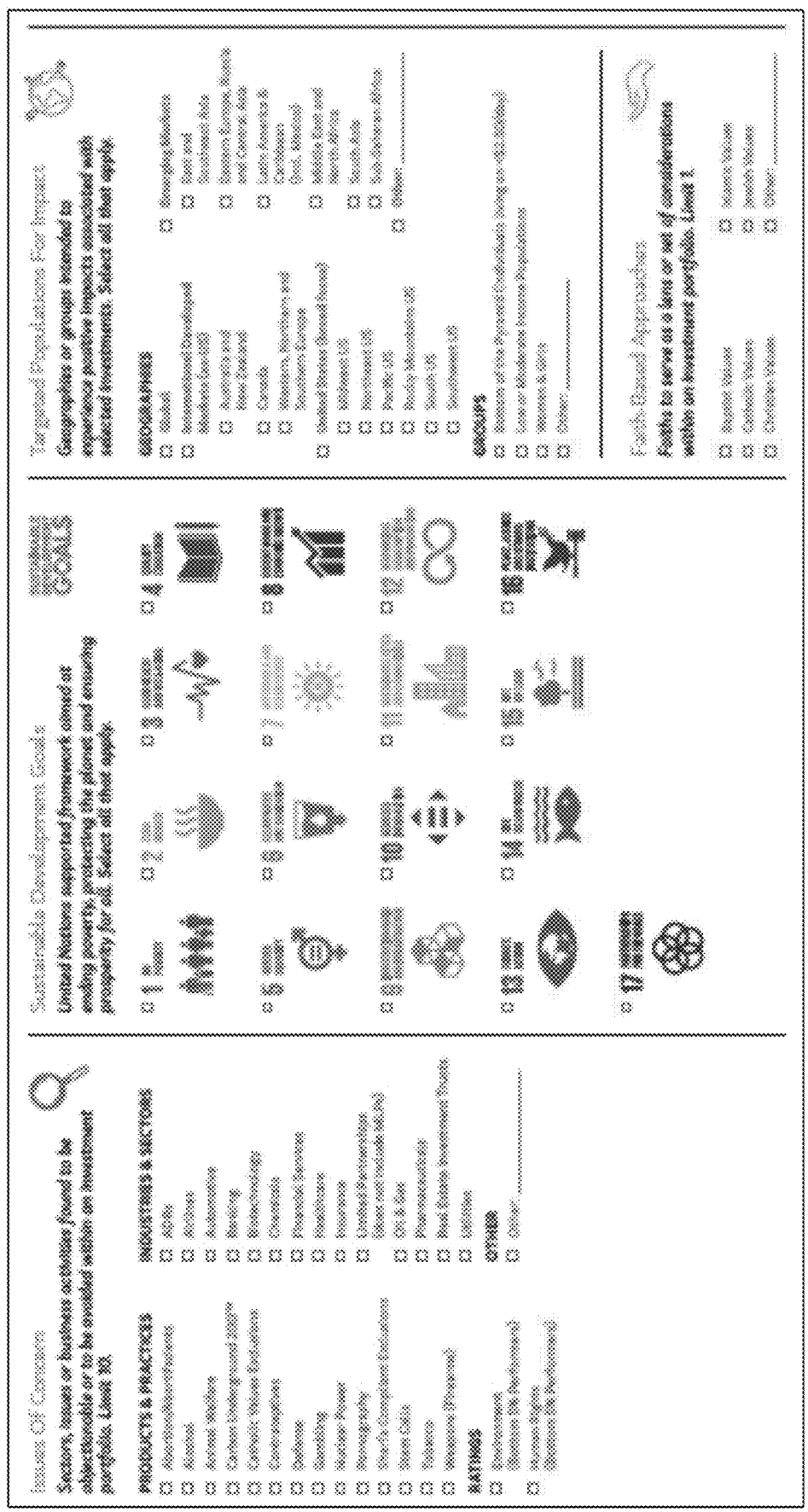
Figure 3:
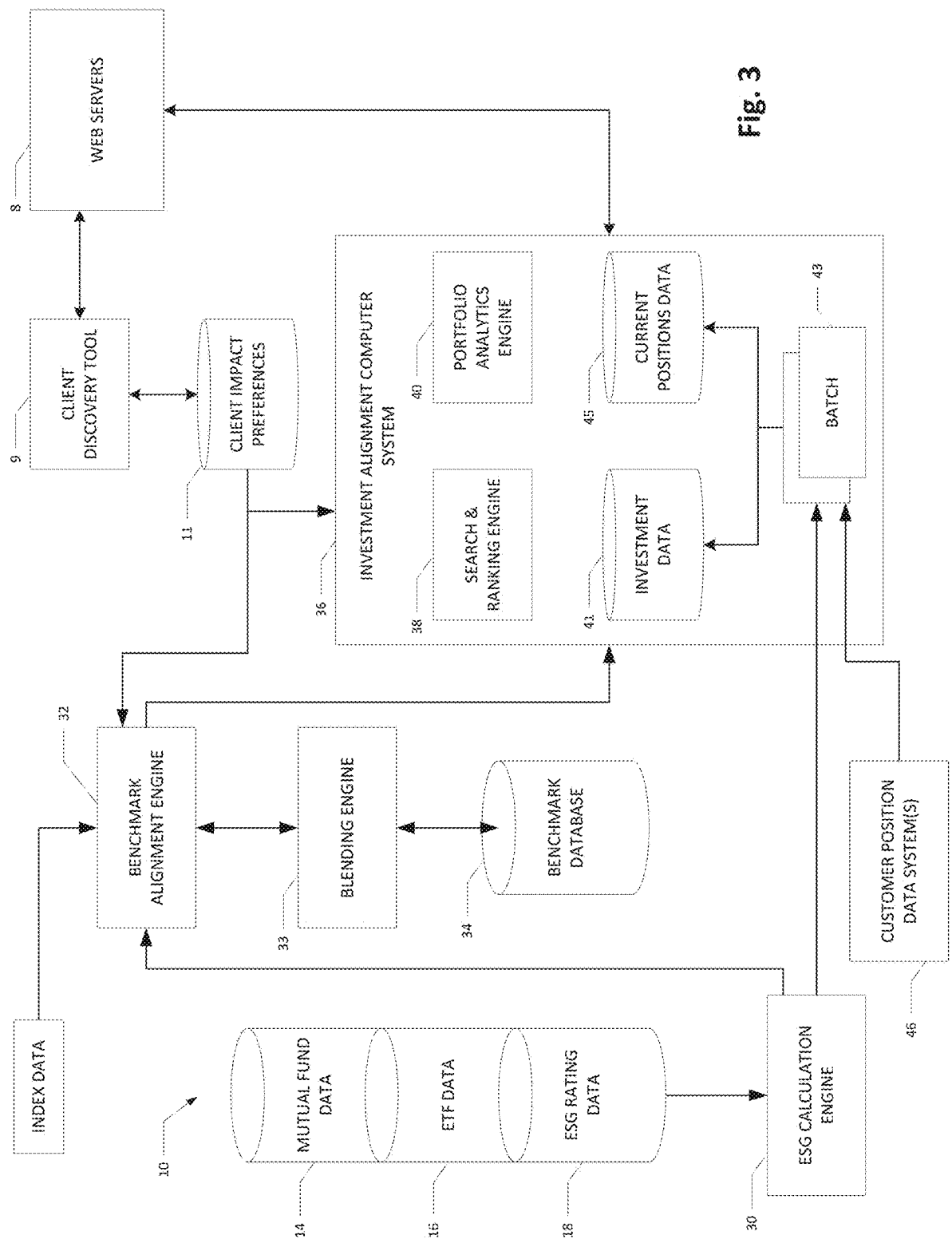
FIG. 3 is block diagram of a computer system for discovering an investor's impact preferences and subsequently assessing and aligning the investor's investments with those preferences according to various embodiments of the present invention.

An example of such a computer system is shown in FIG. 3. The client (or financial advisor on behalf of the client) may log into their account through a website hosted by a web server(s) 8 of the computer system and, on the website, select an option or options to specify the investor's unique impact preferences. The user is then directed to a webpage(s), an example of which is shown in FIGS. 1A-C, that allows the user to specify, using a client discovery tool 9 of the computer system, the client/investor's impact preferences, which are then stored by the brokerage firm's client database 11. For example, the client may click the radio button(s) or the link(s) next to their desired impact preferences shown in FIG. 1A-C to indicate their unique preferences.

A highly detailed taxonomy, such as shown in FIGS. 1A-C, aids in discovering the client's impact preferences at a granular level. In one embodiment, the taxonomy may include a hundred or more lowest-level (most granular) impact preference options that a client can select. In that way, each client can specify a fully customizable set of preferences. In practice, there may be a limit on how many options a client can select so that the optimization and/or benchmarking analyses, described below, can run in an efficient amount of time.

The available impact preference options could be grouped on the website into multiple broad categories to facilitate the discovery process. For example, the impact preference options could be grouped into two categories, such as impact solutions and sustainable corporate practices, as shown in FIGS. 1A-B. The impact themes are further pre-selected groupings of impact solutions and/or sustainable corporate practices to aid in the selection process, and may include, for example: broad-based sustainability (whose impact objectives are advancing positive impact solutions and sustainable corporate practices); climate action (advancing solutions to combat climate change and/or transition to a less carbon intensive economy); fossil fuel aware (encouraging a transition to a less carbon intensive economy by managing exposure to fossil fuel energy sources); gender lens (promoting gender equality in corporate leadership and empowering women and girls); improving lives (generating solutions that contribute to healthy lives and well-being for all ages); and/or inclusive workplace (promoting fair and safe work environment for all employees). A client could select one of more of these impact themes that align with the client's impact preferences.

The impact solutions options correspond to company outputs, including products and services, contributing to solutions of various social and environmental issues, and may include high-level solution categories such as climate solutions; natural resource solutions; and empowerment solutions. A client could select one or more of these high-level impact solutions (in addition to or in lieu of any impact theme selections), or a client could select any sub-categories or sub-sub-categories, etc., within any of these high-level impact solutions. That is, for example, each of the high-level impact solution options may have two or more sub-options within the impact solution category. For example, the climate solutions category may include sub-options such as energy efficiency and cleaner energy sources. Further, each of the sub-categories may have further, more granular selection options. For example, the energy efficiency sub-category may comprise sub-sub-options such as (1) sustainable real estate and building materials, (2) energy efficient transportation, and/or (3) energy storage, management and distribution, etc. The client could select one or more of these sub-options or sub-sub-options in lieu of selecting the high-level impact solution category. If a client selects a high-level category, that selection can be treated as the client having selected all of the sub- and sub-sub-options, etc., within that category for purposes of assessing and benchmarking the client's portfolio etc. Similarly, if a client selects a second-level sub-category, that selection can be treated as the client having selected all of the third-level sub-options, etc., within that second-level category for purposes of assessing and benchmarking the client's portfolio.

The sustainable corporate practices options correspond to company behaviors and operations across different dimensions, such as environmental practices, social practices, and government practices. A client could select one of these high-level practice options, or pick more granular sub-practices or sub-sub-practices within each, as desired (e.g., climate disclosures, climate footprint, etc. for environmental practices, and so on). Again, if a client selects a high-level practice category, that selection can be treated as the client having selected all of the sub- and sub-sub-options, etc., within that category for purposes of assessing and benchmarking the client's portfolio etc. Similarly, if a client selects a second-level sub-category, that selection can be treated as the client having selected all of the third (or lower)-level sub-options, etc., within that second-level category for purposes of assessing and benchmarking the client's portfolio, and so on.

Still further, as shown in the example of FIG. 1C, the client could select, for example, issues of concern, sustainable development goals, targeted populations for impact, and/or faith-based approaches. The options for the issues of concern may be sectors, issues or businesses to be avoided in the investor's portfolio. For example, an investor may choose to monitor or avoid investments in companies that offer objectionable products, such as weapons, tobacco, etc. Additionally or alternatively, the investor could select to avoid investments in companies that have poor ratings in terms of issues like the environment or human rights. Still further, additionally or alternatively, the investor could choose to avoid certain industries and/or sectors, such as airlines, automotive, banking, etc.

The available options might also include sustainable development goals, as shown in FIG. 1C. The sustainable development goals may correspond to the United Nation's published Sustainable Development Goals. The user could select any or all of the listed goals that apply to the investor's impact preferences.

In addition, as shown in FIG. 1C, the investor could select targeted populations for impact. Targeted populations for impact correspond to geographic or other groups an investor intends to experience positive social and environmental impacts. The user could select high-level regions (e.g., countries in emerging markets), or countries or sub-regions within a high-level region, or even further sub-sub-regions as desired. As shown in FIG. 1C, the investor could also select population groups, such as women and girls or those with low- or moderate-income, etc.

Also as shown in FIG. 1C, a user could select faith-based approach as an impact preference, i.e., a set of faith-based or religious guidelines that the inventor intends to guide the investor's investments.

Figure 2A:
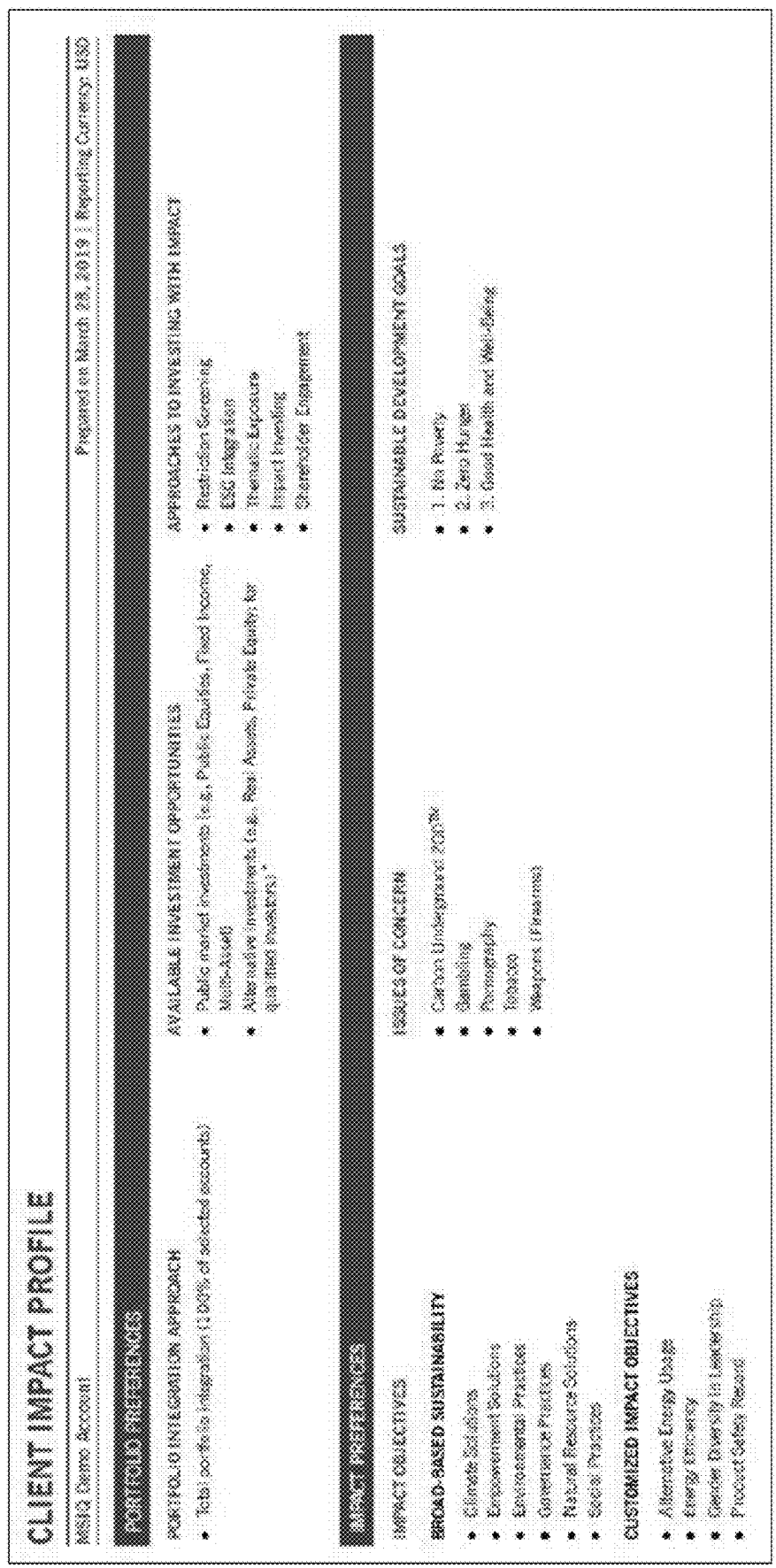
FIGS. 2A and 2B are screen shots summarizing an investor's impact preferences according to various embodiments of the present invention.
Figure 2B:
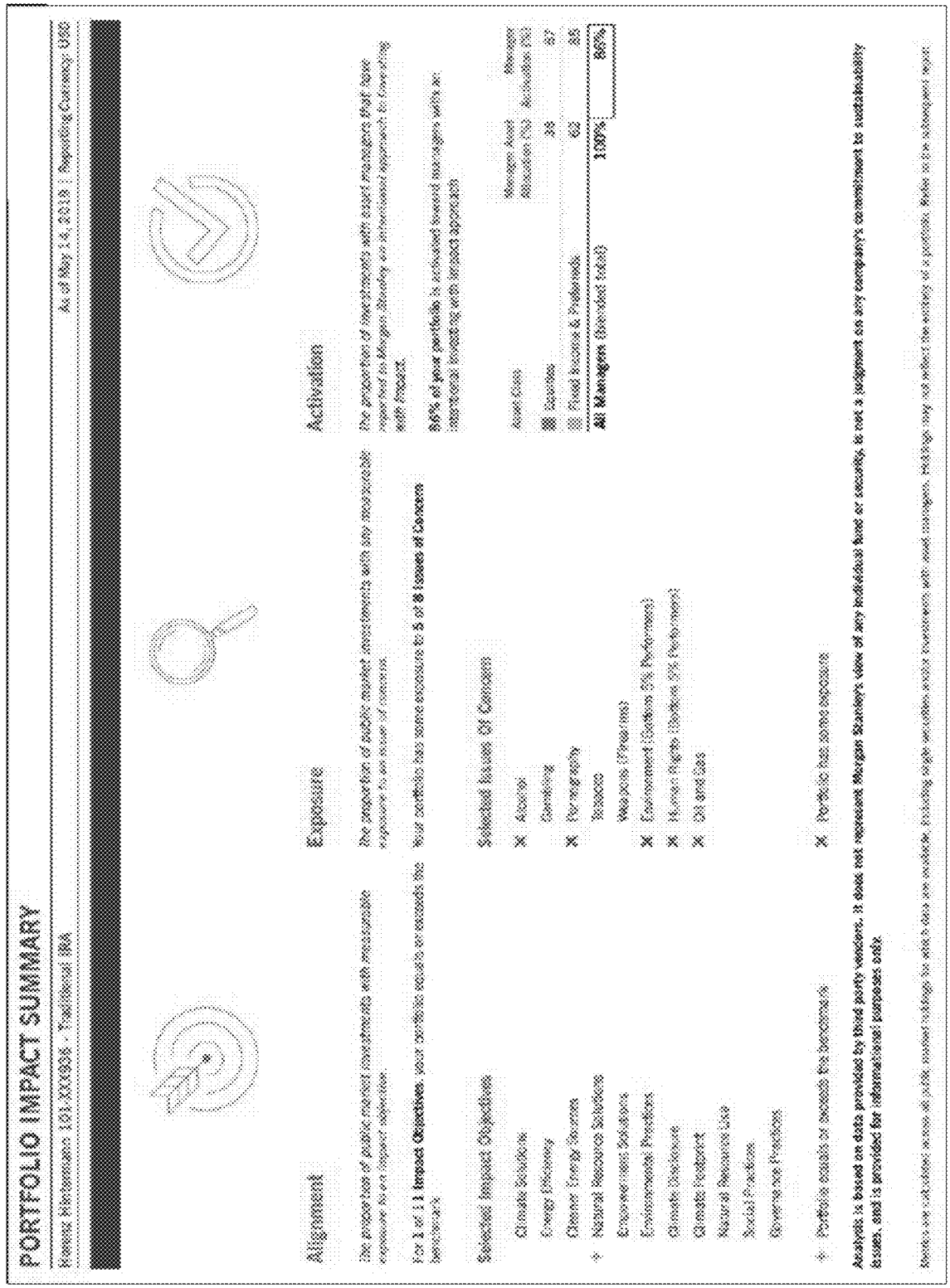

The client discovery tool 9 shown in FIG. 3 may coordinate the process of collecting and storing the investor's impact preferences, and then generating summary web-based interfaces such as shown in FIGS. 2A and 2B. FIG. 2A summarizes the impact preferences identified by the investor after completing the survey. FIG. 2B summarizes how the investor's portfolio performs across various impact preferences, in some cases relative to a benchmark. More details about how the appropriate benchmark for the investor's portfolio is determined and how the investor's portfolio is compared with the benchmark are described below. Note that the summaries of FIGS. 2A and 2B are for different investors, which explains why the impact objectives are different in the two figures. FIG. 2B summarizes how that investor's portfolio meets or exceeds the benchmark for, in this example, only one of the 11 selected impact objectives (natural resource solutions); and that the portfolio has some exposure to five of the eight issues of concern identified by the investor (the ones marked with an X). The activation section of FIG. 2B shows the proportion (by market value) of investments (e.g., funds) in the investor's portfolio where the asset manager for the investment has an intentional approach to investing with impact. Such asset manager intentions can be ascertained from surveys of the asset managers or investing prospectuses issued for the funds. The example shown in FIG. 2B shows that the investor's portfolio has an allocation split of 38/62 for equities to fixed income with, in the aggregate, 86% of the investments, by market value, with asset managers with an intentional investing with impact approach.

Figure 3A:
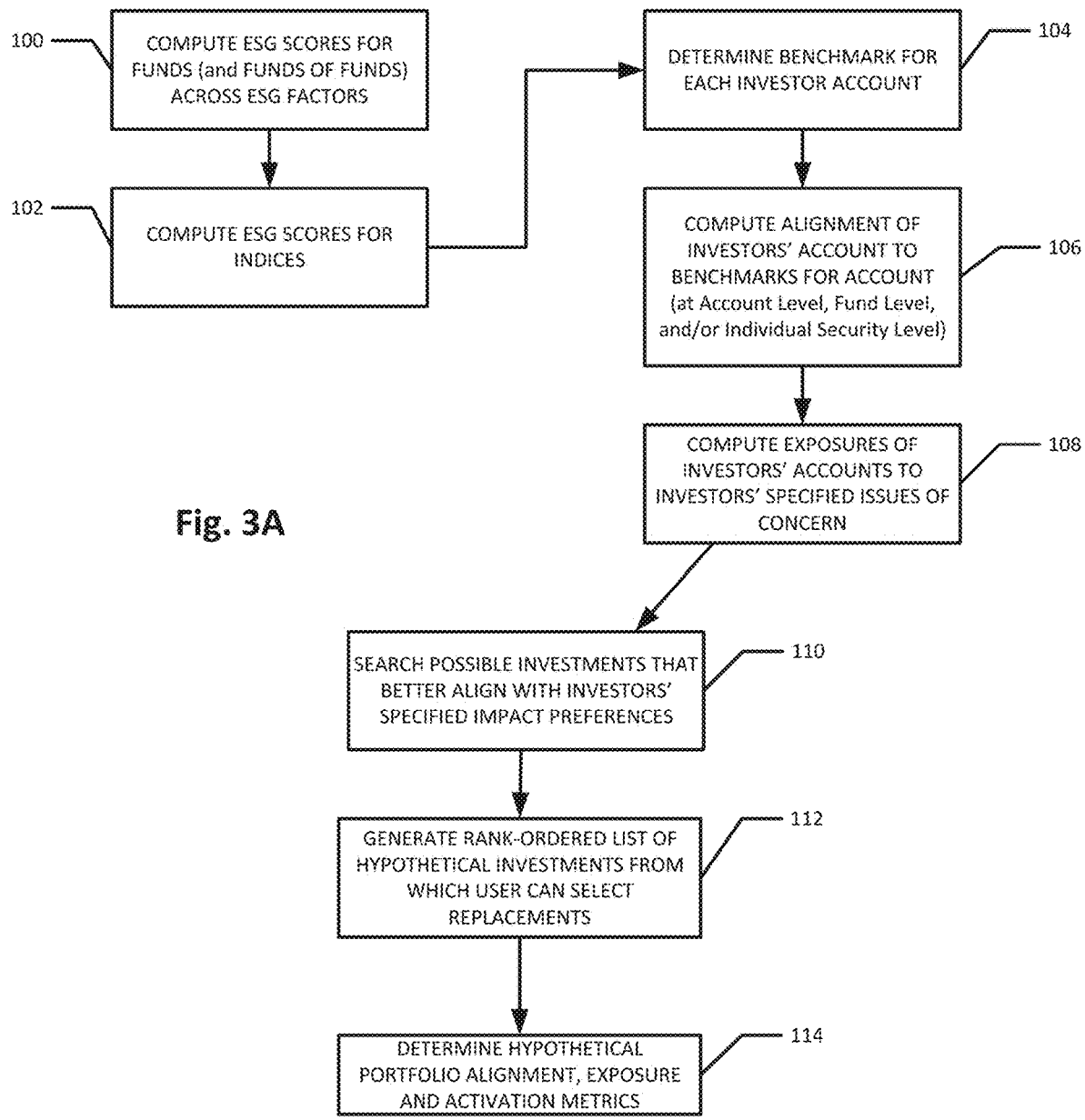
FIG. 3A is a flow chart of a process flow performed by the computer system of FIG. 3 according to various embodiments of the present invention.

FIG. 3 is a diagram of a computer system that may be used with the present invention and FIG. 3A depicts a flow chart of a process performed by the computer system of FIG. 3 according to various embodiments of the present invention. As shown in FIG. 3, the computer system may comprise a database system 10 (which may comprise multiple databases) that stores data about funds and securities in which an investor may invest. The database system 10 may comprise, for example, a mutual fund database 14, an exchange traded fund (ETF) database 16, and an environmental, social and governance (ESG) ratings database 18. The mutual fund database 14 may store data about which securities are owned by which mutual funds. Similarly, the ETF database 16 may store data about which securities are owned by which ETFs. Such mutual fund and ETF holding data may be provided from an external data source(s) that continually tracks and updates the holdings of mutual funds and ETFs. The database system 10 may also store data about the securities held by separately managed accounts (SMAs), which is not shown in FIG. 3 for simplicity. The ESG ratings database 18 may store ESG data for companies or other issuers with tradable securities, which is on the order of hundreds of thousands of companies and issuers worldwide. The data may comprise, for example, rankings for each of the companies in various ESG categories. The ESG ratings stored in the ESG database 18 may be sourced from external data sources that provides such rankings, such as MSCI or ISS.

For example, greenhouse gas emissions can be measured and/or estimated in a suitable manner. On an annual basis companies may disclose their total amount of greenhouse gas emissions (GHG). The Green House Gas Protocol is the most widely used GHG accounting tool for businesses, governments and NGOs. GHGs include carbon dioxide ($CO_2$), methane ($CH_4$), nitrous oxide ($N_2O$), hydrofluorocarbons (HFCs), perfluorocarbons (PCFs), sulphur hexafluoride ($SF_6$) and nitrogen trifluoride ($NF_3$), as set out by the Kyoto protocol, but are measured and reported by companies in $CO_2$ equivalent for comparability. Emissions are categorized as Scope 1, 2 or 3 dependent on if they are directly or indirectly coming from business operations. Scope 1 emissions, direct emissions, are inclusive of all fossil fuels used in onsite manufacturing or processing and company vehicles. Scope 2 and 3 are indirect sources of emissions. Scope 2 emissions are calculated or estimated by available data from the building energy consumption through electric or heating bills at the individual meter and converting the measured amount of energy passing through the meter (kilowatt hour, kWh) into its equivalent estimated greenhouse gas emissions using the underlying fuel mix of the electric grid where the meter was located (as per the US Environmental Protection Agency's (EPA) Power Profiler Fuel Mix) and converting the fuel mixes into carbon dioxide equivalent using the EPA's GHG equivalencies conversion rates, supplied by the Intergovernmental Panel on Climate Change. Companies may include additional fossil fuel consumption associated with their activities as part of Scope 3, disclosing their own GHG emissions associated with downstream goods and services. Additionally, third-party ESG data providers may use models to estimate the amount of $CO_2$ if a company does not disclose publically, based off of historical company-specific data or historical industry-specific data and extrapolated for the size and geographic location of the company. Once captured or estimated by third-party ESG data providers using analysts or through machine learning techniques that use text analysis to read reports, this metric will be reported in the ESG ratings dataset as "Carbon Emissions" and is used as an underling data point by the computer system of FIG. 3 according to various embodiments of the present invention.

Gender diversity data for companies, such as board gender diversity, can also be measured in a suitable manner. On an annual basis public companies must release an annual report to shareholders. Included in the report is a disclosure of the total number of board members and their associated gender. Third-party ESG data providers will capture this information through the use of analysts reading annual reports or through machine learning techniques that use text analysis to read annual reports. Once captured, a ratio will be created by taking the disclosed number of female directors divided by the total number of directors (both male and female). This metric will be reported in the dataset as "Percentage of Female Board of Directors" and is used as an underlying data point by the computer system of FIG. 3 according to various embodiments of the present invention.

In various embodiments, the database system 10 can ingest data from the various internal and external data sources in various data formats such as XML, CSV and Mainframe Cobol files. For example, the database system can ingest mutual fund data from Morningstar, whereas ETF and SMA data can be sourced from internal systems of a brokerage (e.g., institutional and wealth management advisory systems, respectively). In various embodiments, Secure Shell (SSH) File Transfer Protocol (SFTP) is used to source external data feeds, such as from Morningstar and MSCI. SFTP is a network protocol that provides file access, file transfer, and file management over a reliable data stream. The transfer protocol is run over a secure channel, such as a SSH data stream. In various embodiments, the Secure Copy Protocol (SCP) is used for internal file transfers (within the brokerage's systems). SCP is a network protocol based on the Berkeley Software Distribution r-commands (BSD RCP) protocol, which supports file transfers between hosts on a network. SCP uses SSH for data transfer.

As mentioned previously, the database 11 may store the investors' impact preferences collected from the online survey.

As shown in FIG. 3, the computer system may comprise an ESG calculation engine 30. The ESG calculation engine 30 preferably computes, at step 100 shown in FIG. 3A, ESG scores for individual securities as well as mutual funds, ETFs and SMAs across a number of ESG factors (e.g., the high- and low-level impact objectives listed on the menu of FIGS. 1A-B). Thus, each security or fund may have a score for each ESG factor. For funds, the ESG scores may be computed based on the individual securities held by the various funds (which data is stored in the database system 10) based on the ESG rating data for the individual securities stored in the ESG rating database 18. The ESG calculation engine 30 can compute the ESG scores for the individual funds at step 100 by rolling up the market value of the securities held by the individual funds that meet or exceed a defined threshold for the given ESG factor. Using still further recursions, the ESG calculation engine 30 can compute the ESG scores for funds-of-funds. In various embodiments, for a particular ESG factor, if a fund has less than 70% or greater than 110% of the underlying securities (by market value) evaluated by external ESG data source, then the ESG score for that factor is not computed for the fund. The security-level and fund-level ESG scores by ESG factor computed by the ESG calculation engine 30 are used to determine whether an investor's portfolio aligns with the investor's impact preferences, as collected via the online survey. The ESG scores at the security-level and fund-level may be computed nightly every trading day to keep the ESG scores up-to-date.

The ESG calculation engine 30 may also compute the ESG scores across the ESG factors for various indices at step 102 in FIG. 3A that are common fund benchmarks, such as the S&P 500, the Russell 2000, etc. The ESG scores for the indices may be computed the same way as computed for a fund, assuming the benchmark index holds the constituent index members in proportion to their market capitalization or other weights as determined by the index provider.

Also as shown in FIG. 3, the computer system may comprise a benchmark alignment engine 32, a benchmark blending engine 33, and a benchmark database 34. The benchmark alignment engine 32 computes a comparison between a portfolio of a client/investor and an appropriate benchmark for the portfolio, with the appropriate benchmark being computed by the benchmark blending engine 33. In various embodiments, each mutual fund, ETF, SMA, etc. is classified into an asset class and assigned a benchmark based on this asset classification. This benchmark is typically an index, such as the S&P 500, the Russel 2000, etc. The assigned benchmark for each asset class is stored in the benchmark database 34. The benchmark for an investor's portfolio is computed, at step 104 in FIG. 3A, by the blending engine 33 and can be a weighted average of the benchmarks of the funds held by the portfolio in proportion to their market value. For example, if an investor's portfolio holds five funds each in equal proportion by market value and each has a separate benchmark, the benchmark for that portfolio would be the blend of the benchmarks for the five funds with each fund/benchmark being weighted equally, although typically multiple funds in a portfolio are not equal in value and multiple funds could have the same benchmark. In the descriptions and examples below, it is assumed that the appropriate benchmark for the portfolio is a blended benchmark unless otherwise noted and recognizing that in some circumstances a single, unblended benchmark could serve as the appropriate benchmark for a portfolio.

Also as shown in FIG. 3, when requested, e.g., via a website hosted by the web server(s) 8, the benchmark alignment engine 32 can compute, at step 106 in FIG. 3A, the alignment of an investor's holdings in a portfolio for the investor's impact preferences, as compared to the blended benchmark for that portfolio. As an example, assume that the survey exposes that an investor has the following impact objectives.

| Impact Solutions | Sustainable Corporate Practices |
|---|---|
| Climate Solutions | Environmental Practices |
| Energy Efficiency | Alternative Energy Use |
| Natural Resource Solutions | Social Practices |
| Empowerment Solutions | Product Safety Record |
|  | Governance Practices |
|  | Gender Diversity in Leadership |

Figure 4:
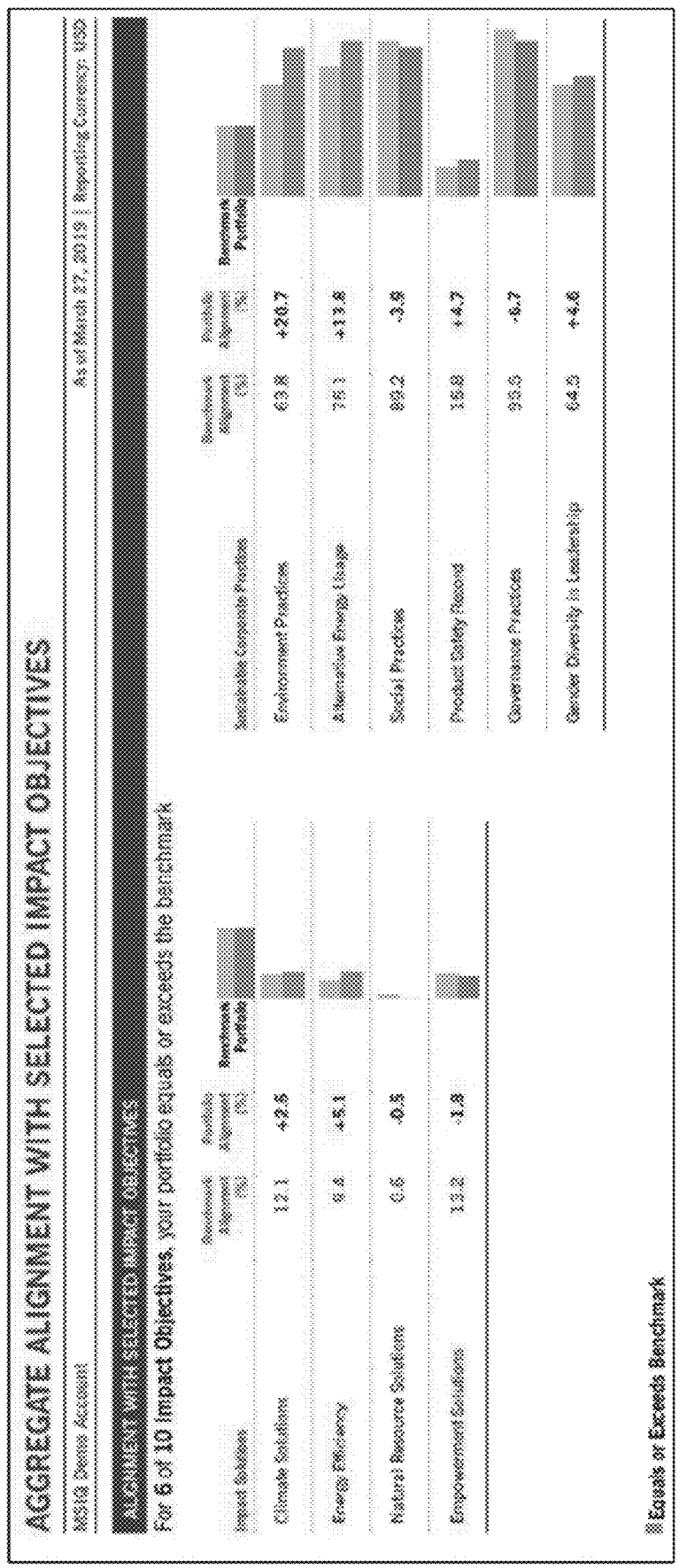

The benchmark alignment engine 32 then compares the holdings in the investor's portfolio to the blended benchmark to see how the investor's portfolio compares to the blended benchmark in terms of the investor's identified impact objectives. To make such a comparison for a particular impact objective, the benchmark alignment engine 32 computes the percentage of holdings (e.g., individual securities or funds) of both the investor's portfolio and the blended benchmark that are classified as satisfying the particular impact objective, based on the data computed and stored by the ESG calculation engine 30. An example of such an analysis is shown in FIG. 4. This example shows that 12.1% of the blended benchmark's holdings (by market value) satisfy the criteria (i.e., meet or exceed a threshold) for the climate solutions impact objective and that 14.7% of the holdings (by market value) in the investor's portfolio—or +2.6% compared to the benchmark—satisfy the climate solutions impact objective criteria. Thus, the investor's portfolio exceeds the blended benchmark for this particular impact objective. The comparison between the investor's portfolio and the benchmark for the investor's other impact objectives are shown in the example of FIG. 4.

Figure 5:
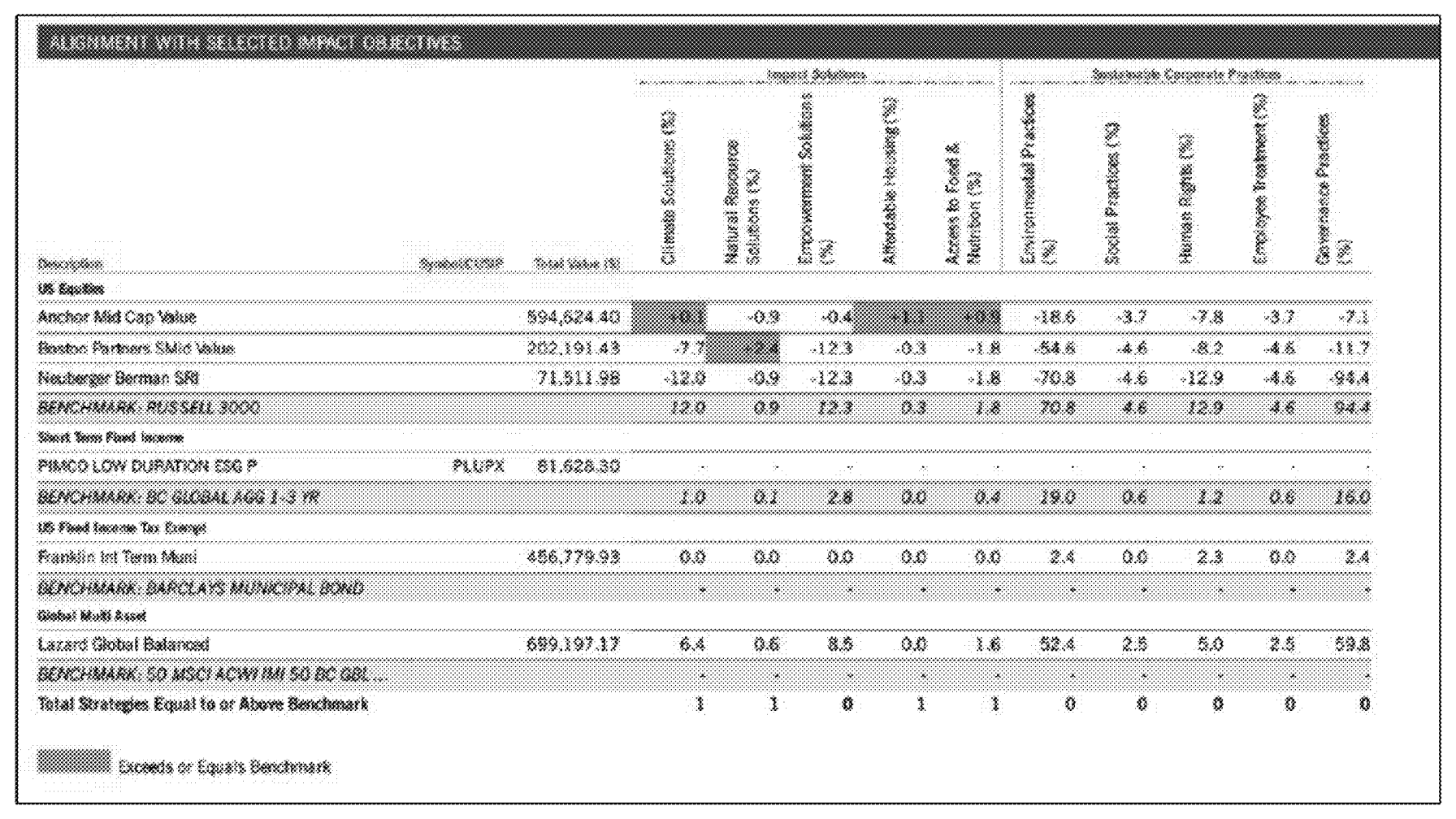

The alignment shown in FIG. 4 is at the portfolio level, i.e., how the investor's portfolio aligns with the blended benchmark for the portfolio. The benchmark alignment engine 32 could also perform an alignment calculation at the fund level for a portfolio, e.g., compare the scores for individual funds held in the portfolio to the respective benchmark for the funds to see the relative alignment of the funds to their respective benchmarks across the particular impact preferences. Such an example is shown in FIG. 5. In this example, the investor's portfolio holds the funds listed on the left-hand side, except that the benchmarks are shown in shaded grey rows. The benchmark for the first three funds is the Russell 3000. The row for the Russell 3000 shows its percentages of holdings (by market value) for each impact objective in this example, and the rows for the funds show how they compare to the Russell 3000 benchmark. In this example, for most impact objectives the investor's funds are below the relevant benchmark with the exception where the funds are meeting or exceeding the benchmark highlighted in green. As shown in this example, some of the funds and some of the benchmarks do not have scores (percentages) for certain impact objectives. That is because, as explained above, if a minimum threshold percentage (e.g., 70%) of the fund or index was not assessed, its scores are not reported due to lack of confidence.

Figure 6:
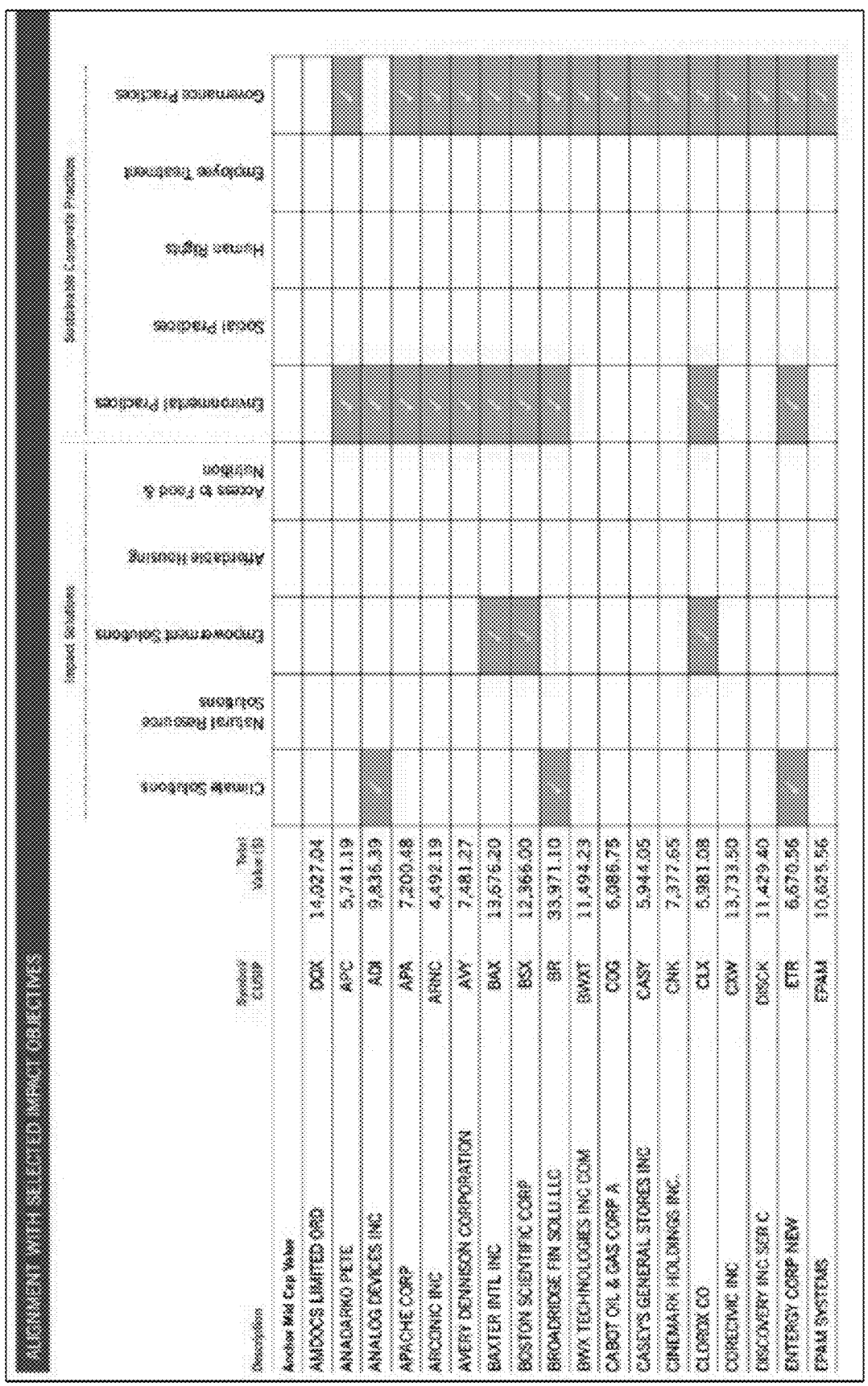

The alignment can also be assessed at the individual security level as shown in the example of FIG. 6. This example show securities that are held by a portfolio, whether as part of a separately managed account (e.g. Anchor Mid Cap Value in FIG. 6) or owned directly by the investor. Securities held as part of a mutual fund or ETF are not displayed. The grid shows which securities satisfy the investor's impact objectives, as determined by the ESG calculation engine 30. The market value of the securities that satisfy the particular impact objective (e.g., climate solutions) are aggregated and compared to the market value of the entire portfolio to determine the percentage of the portfolio that meets the particular impact objective when determining the alignment, as described above.

Figure 7:
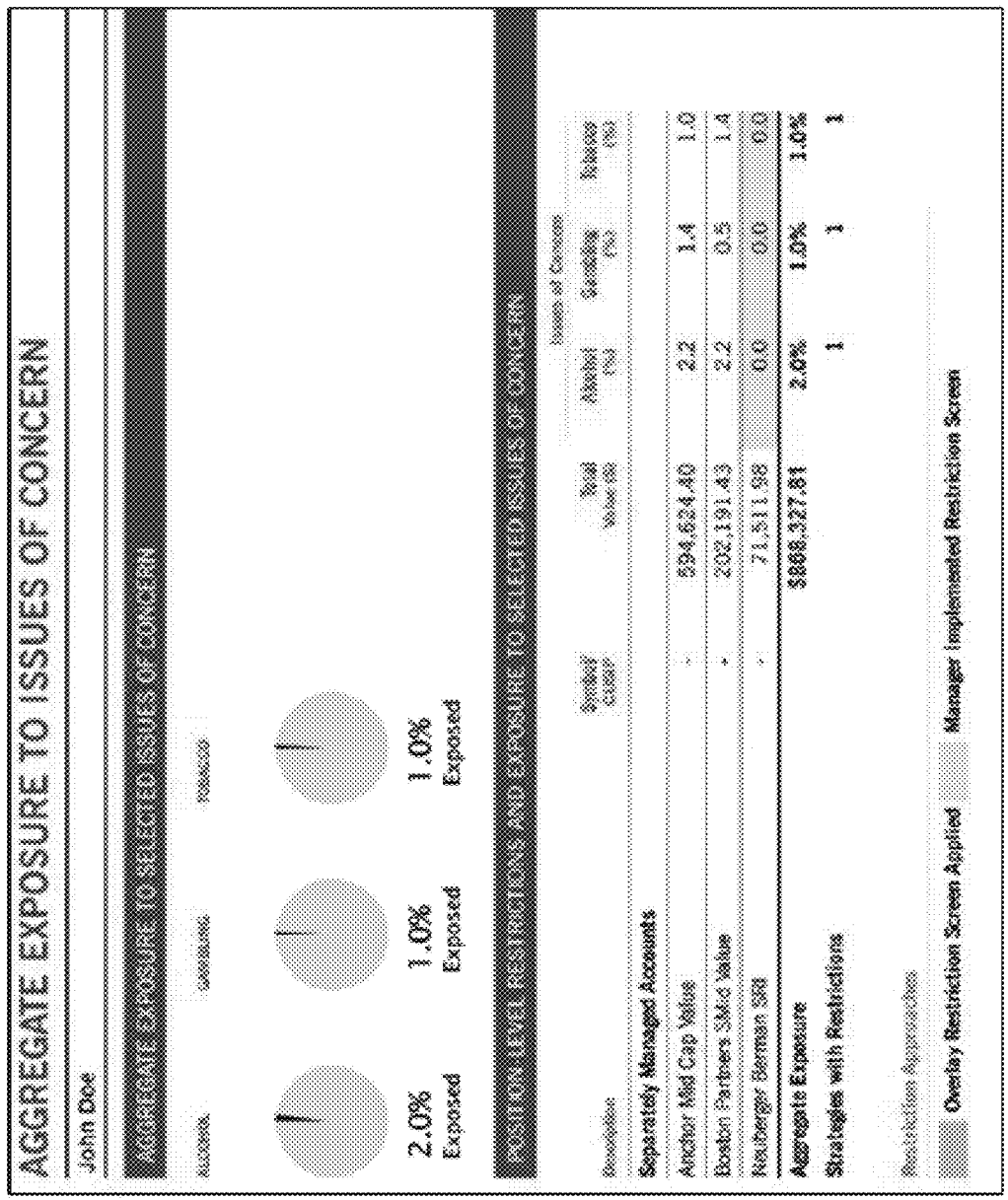

The Investment Alignment Computer System 36 can also compute, at step 108 in FIG. 3A, the exposure of the investor's portfolio to the investor's specified issues of concern. An example of such an analysis is shown in FIG. 7, which shows an example where an investor's specified issues of concern are alcohol, gambling and tobacco. The Investment Alignment Computer System 36 can perform this calculation by computing, as a percentage of the total market value of the investor's portfolio, the total market value of the security-level holdings (whether held at the security level or in a fund) in the investor's portfolio that derive certain amounts of revenue from alcohol, gambling and tobacco in this example. In this example of FIG. 7, the investor's portfolio only holds the three funds listed under "Separately Managed Accounts" and not any directly owned individual securities. Of course, an investor could specify other issues of concern as described above. The example in FIG. 7 shows the absolute holdings of the investor's portfolio in these issues of concern, as opposed to showing them relative to the benchmark. Of course, alternatively or additionally, the benchmark alignment engine 32 could compute the holdings in the investor's specified issues of concern relative to the appropriate (blended) benchmark for the investor's portfolio.

Figure 8:
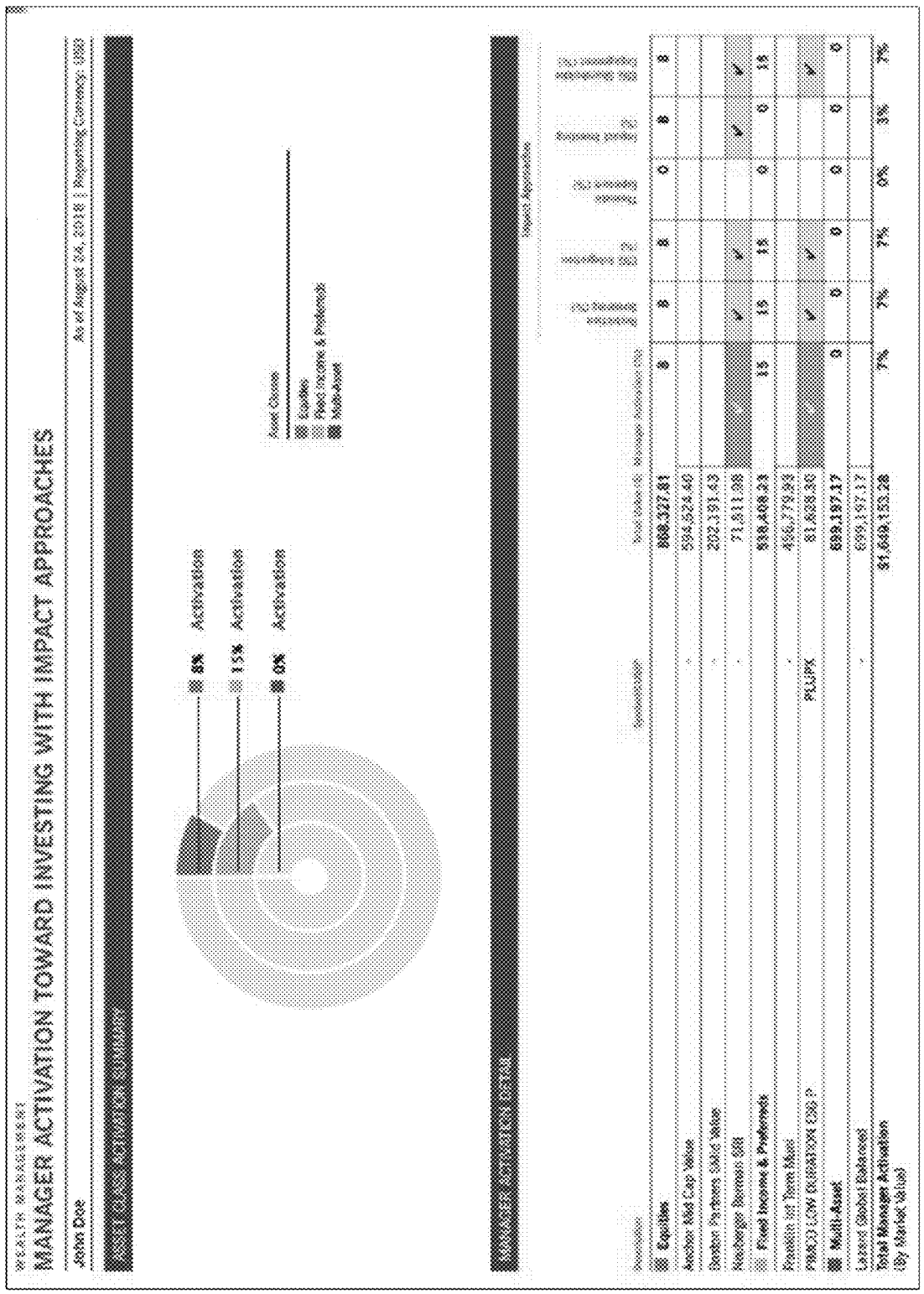
FIGS. 8 to IO are screen shots showing fund manager activation toward impact preferences according to various embodiments of the present invention.
Figure 9:
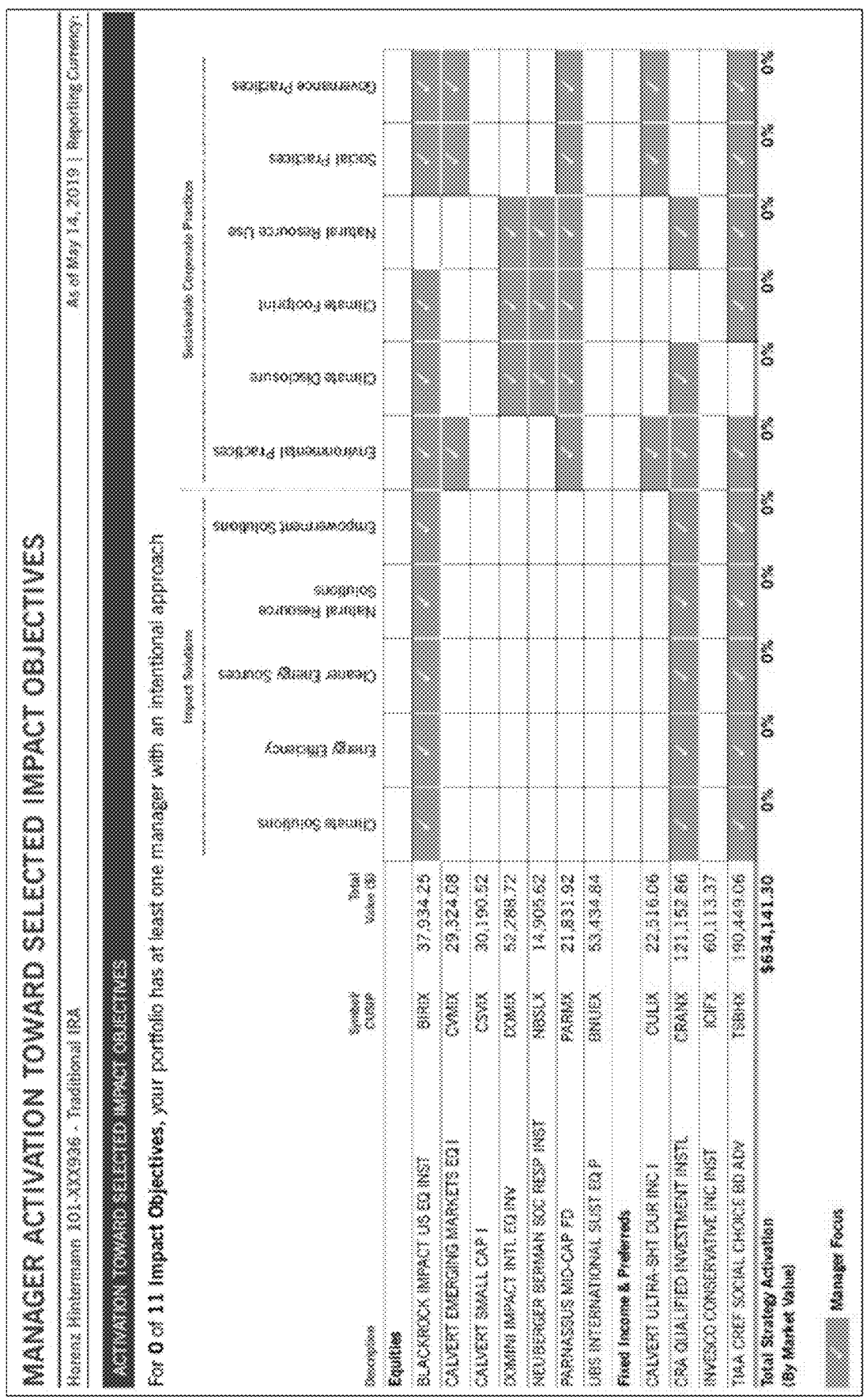
Figure 10:
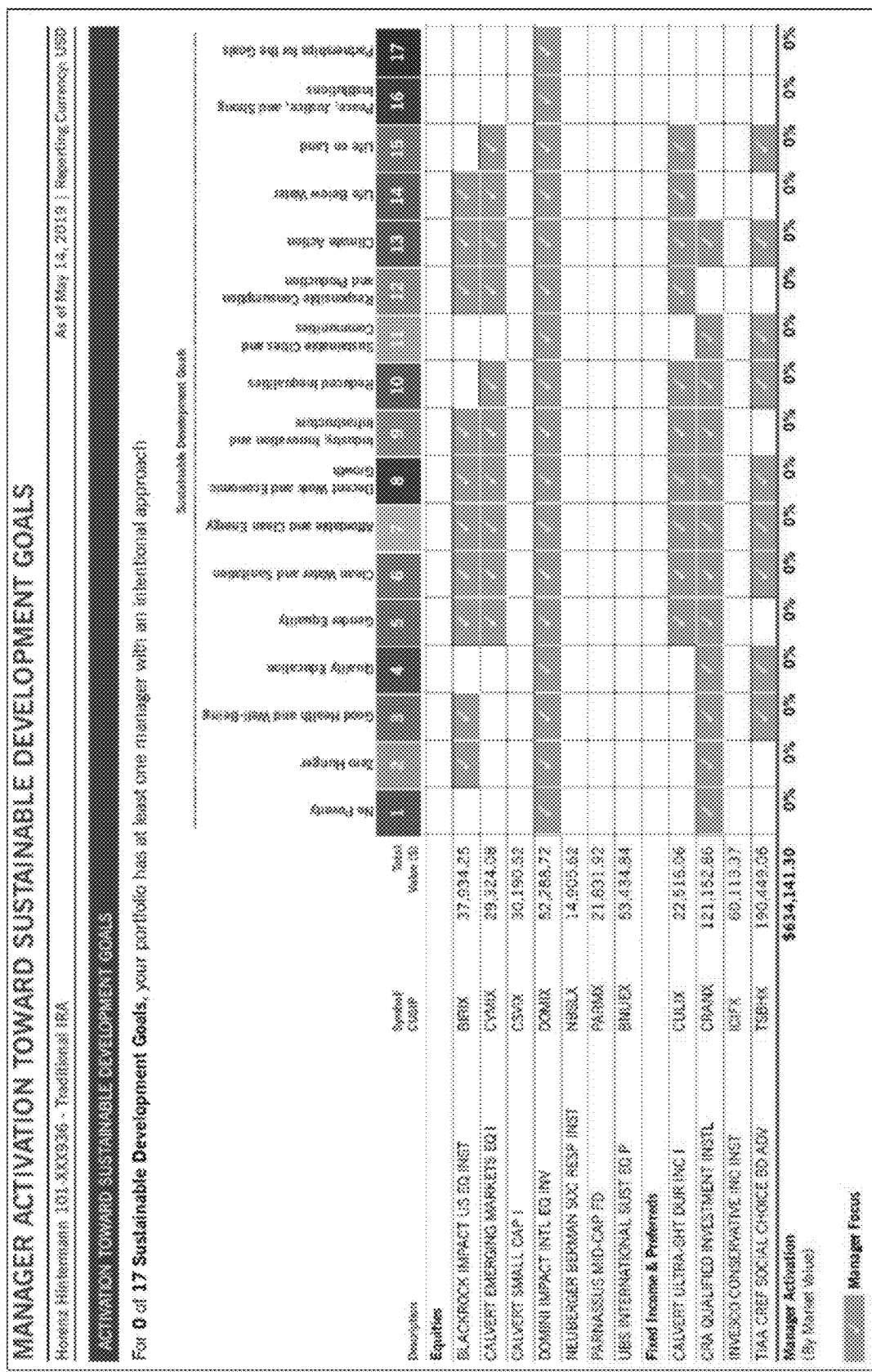

The mutual fund, ETF and SMA databases can also track the activation of the fund managers toward various impact preferences. This fund impact preference activation data can be obtained by surveying the fund managers and/or based on fund prospectuses that describe the investing approaches of the various funds. FIGS. 8, 9 and 10 show example fund manager activations. FIG. 8 shows funds in an investor's portfolio that employ certain impact approaches, such as restriction screening, ESG integration, thematic exposure, impact investing and/or ESG shareholder engagement. Checkmarks in an impact approach category show that the corresponding fund employs the approach and a non-checkmark indicates that either there is not enough or reliable information to make a determination or that the fund is not pursuing the impact preference. The numbers in the column show the percentage of the portfolio by market value that employs the indicated approach. FIG. 9 shows whether the funds are being intentional in their investing in the particular impact preferences (e.g., impact solutions, sustainable corporate practices, etc.) specified by the investor. Again, a checkmark indicates that the data shows that the fund is intentionally investing in companies based on the indicated impact preference. FIG. 10 is similar to FIG. 9, except that FIG. 10 shows fund intentionality toward the Sustainable Development Goals.

As shown in FIG. 3, the computer system may also comprise an investment alignment computer system 36 that discovers potential investments for an investor that better align with the investor's specified impact preferences than the investor's current portfolio holdings. As shown in FIG. 3, the investment alignment system 36 can comprise a search and ranking engine 38 that, at step 110 of FIG. 3A, searches the possible investments to discover investment opportunities that better align with an investor's specified impact preferences. Data about the funds, including their security level impacts, exposures to issues of concern, and financial and operational data, may be stored in an investment database 41. The investment ratings and data can be loaded from the ESG calculation engine 30 (and other data sources as necessary) using, for example, SQL Server Integration Services (SSIS) batch service 43. The search and ranking engine 38 may search possible investments from the investment database 41. In various embodiments, the search query is built dynamically based on the criteria provided by the user, which may look like: "Select all products (MF, ETF, SMA) WHERE Attribute 1 operator Value AND Attribute 2 operator Value AND AND Attribute n operator Value." Attributes, values and operators are captured from the alignment engine tool. Supported operators are: Equals, Greater Than, Less Than, Greater Than or Equals, Less Than or Equals, In-Between. The investment products returned from the above search are ranked from 0 to n where higher rank (closer to 0) indicates better alignment (or lower exposure to issues of concern). The ranking may be performed based on user-specified impact preferences considering rules such as: Rule 1 for alignment—"Higher the alignment, Higher the Rank"; and Rule 2 for exposure to issues of concern—"Lower the exposure, Higher the Rank".

As shown in FIG. 3, the search criteria employed by the search and ranking engine 38 can include, for example, (i) the investor's specified impact preferences (e.g. stored in database 11), (ii) operational criteria, such as asset class for the investment, expense ratio, minimum investment, etc. (e.g., stored in database 41), and/or (iii) financial criteria (e.g., returns of an investment over various time periods, such as YTD, 3-year, 5-year and 10-year windows, the funds' alpha, R-squared, information ratio, and Sharpe ratio, for example) (e.g., stored in the database 41). Based on these factors, the search and ranking engine 38 can generate, at step 112 of FIG. 3A, a rank-ordered list of investments that could be included in a hypothetical portfolio (a list of funds and attributes for the selected search criteria, including the investor's specified impact preferences). Based on the user's selection of investments from the rank-ordered list (i.e., replacements made to an investor's current portfolio that would result in a hypothetical portfolio), the portfolio analytics engine 40 can determine, at step 114 of FIG. 3A, the hypothetical portfolio's alignment with various impact preferences, exposure to various issues of concern, and activation toward various impact approaches. Data about the investors' current portfolios can be stored in a current positions database 45. The investors' current position data can be migrated or loaded from data systems 46 that store data about the investors' positions using, for example, a SSIS batch service 43.

Figure 11:
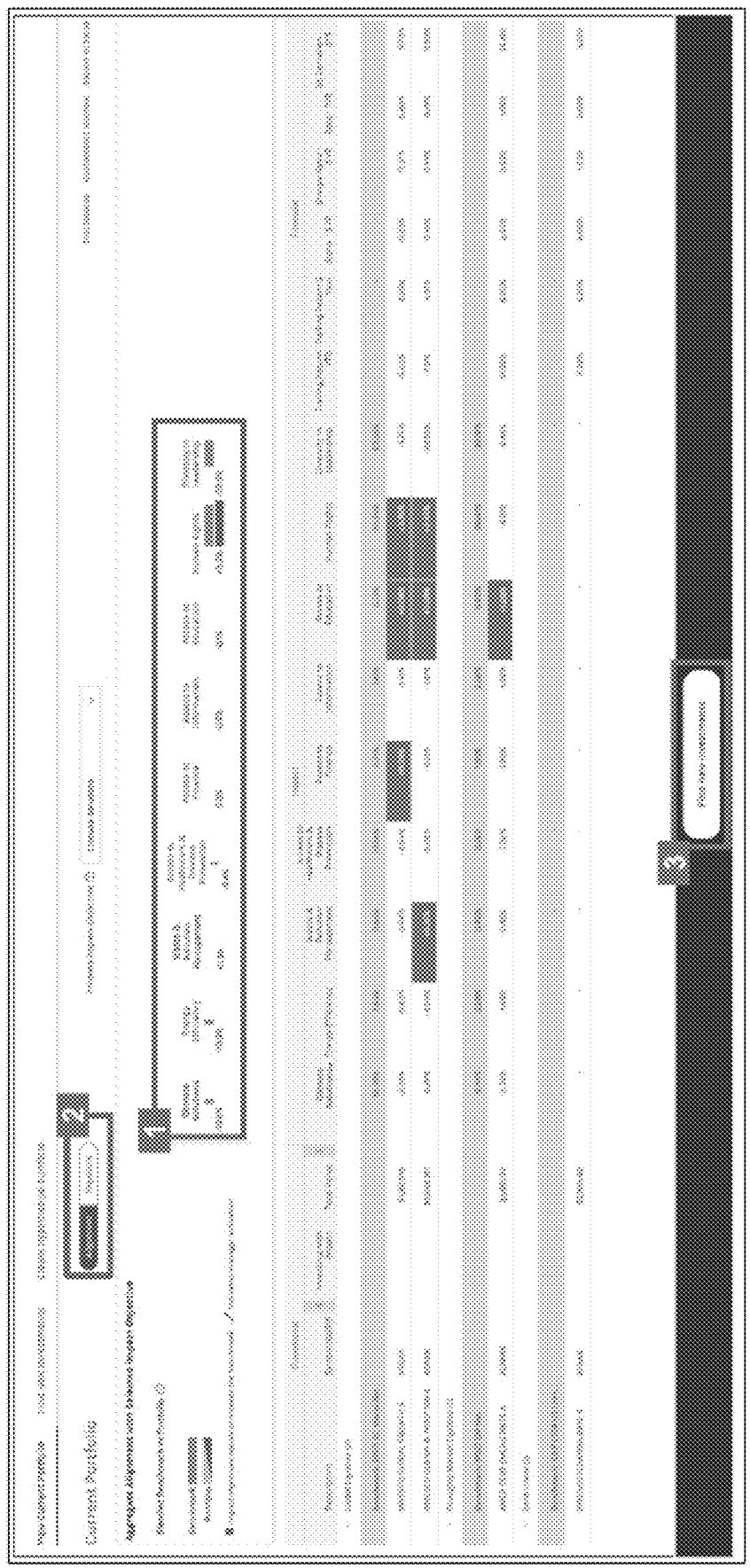
FIGS. 11 to 20 are screen shots showing how the computer system of FIG. 3 can generate and assess a hypothetical portfolio for an investor according to various embodiments of the present invention.

FIGS. 11 through 15 show how a user of the system could interact with the investment alignment system 36 to generate a hypothetical portfolio. FIG. 11 is a table that summarizes the investor's current portfolio. This data can be generated from data stored in a current positions database 42, which can receive periodically (e.g., nightly after every trading day) the investments held by the respective investors. The percentages and icons in Part 1 of FIG. 11 show the alignment between the portfolio as a whole and the portfolio's blended benchmark for the selected impact objectives. The table below Part 1 shows a comparison of various funds in the portfolio to the benchmark for the selected impact objectives. These benchmark-related values can be determined by the benchmark alignment engine 32 as described above. Part 2 shows that the user could select between alignment and exposure (i.e., exposure to issues of concern). In the example of FIG. 11 the user selected alignment. Part 3 shows the button that the user can activate to cause the search and ranking engine 38 to look for new investment opportunities.

Figure 12:
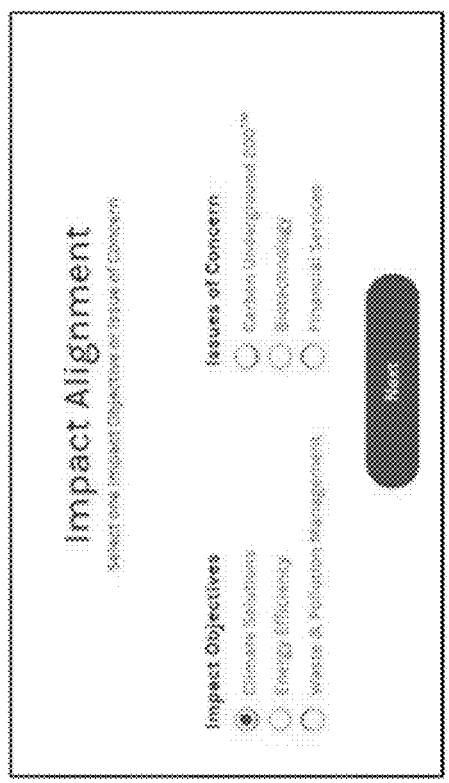
Figure 13:
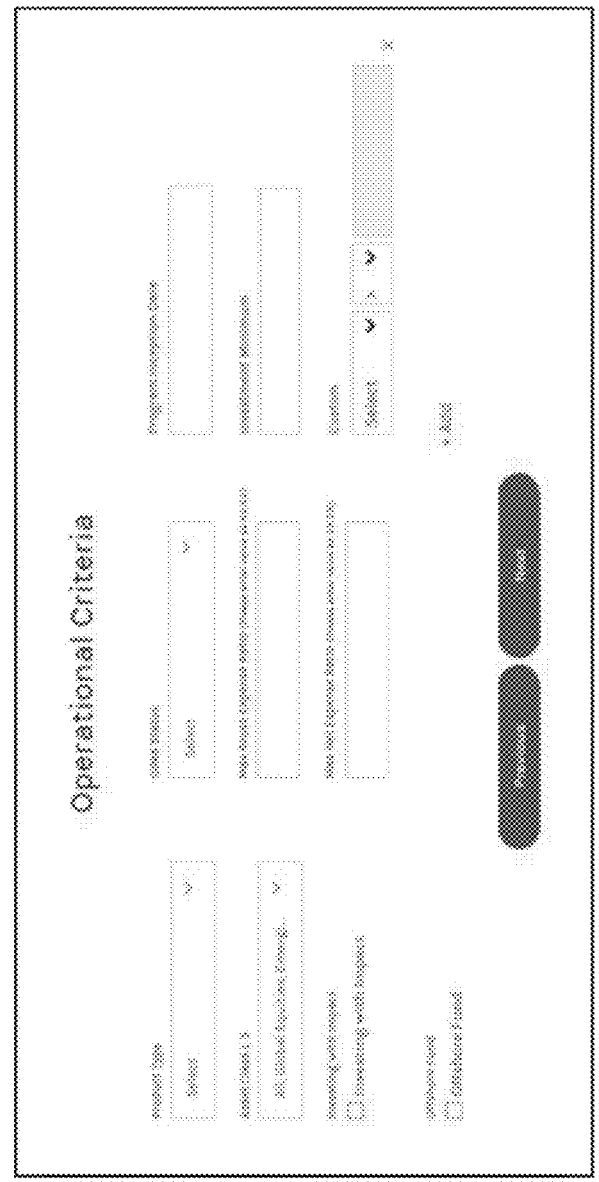
Figure 14:
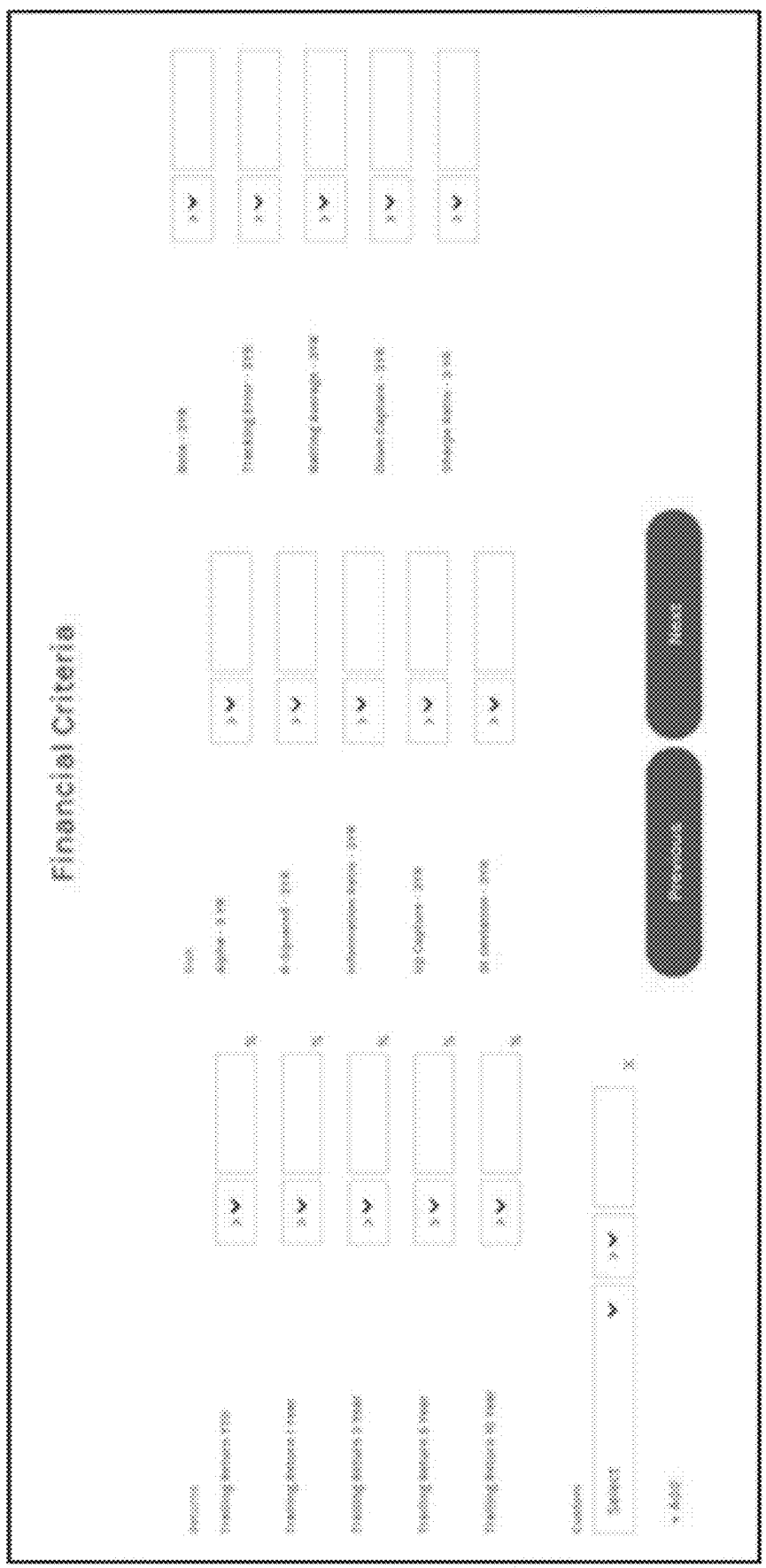
Figure 15:
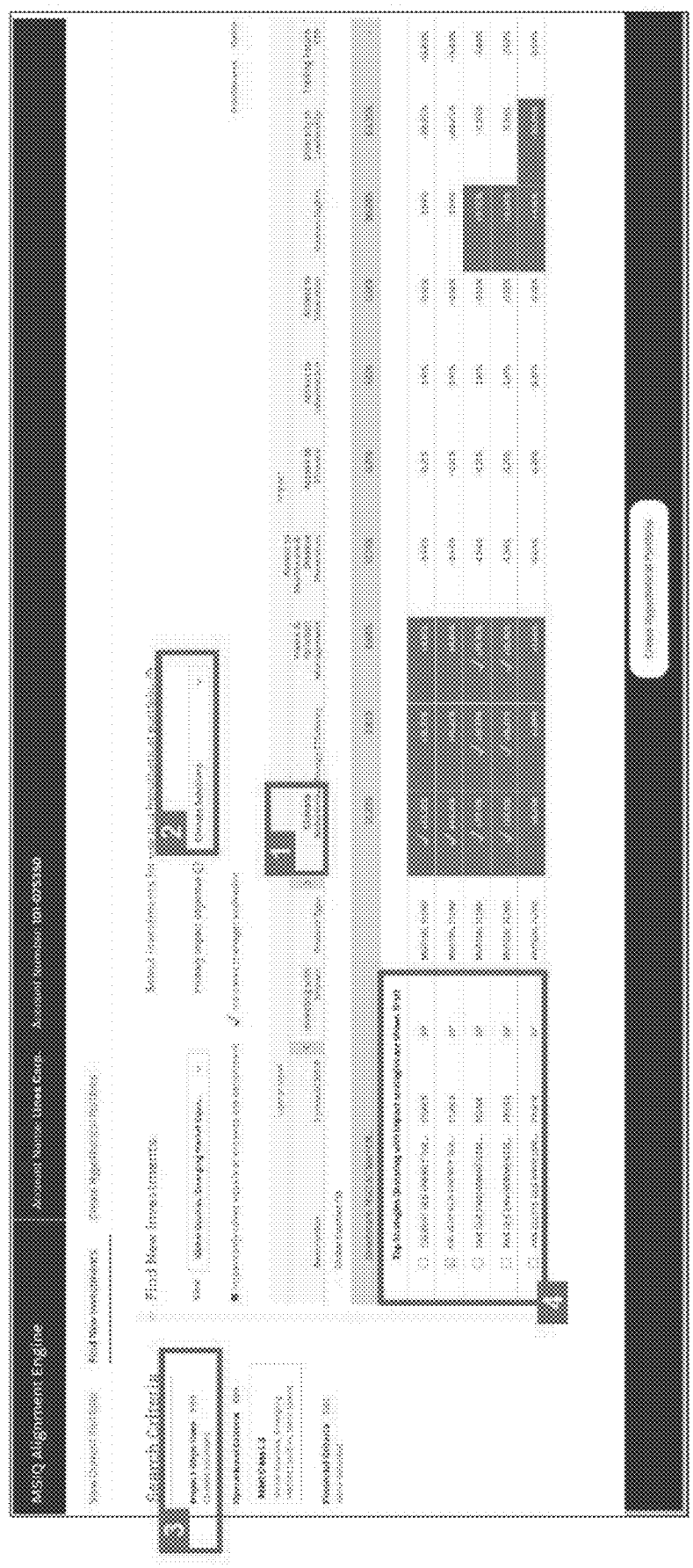

Next, as shown in FIG. 12, the user could specify for which impact objectives or issues of concern the user wants to prioritize in creating the hypothetical portfolio. In one embodiment, as shown in FIG. 12, the user selects one impact objective or one issue of concern to reduce the variables that have to be optimized by the search and ranking engine 38. The available choices in FIG. 12 coincide with the impact preferences that the investor selected when the investor completed the impact preference survey described previously. That is, the particular impact objectives and/or issues of concern that the investor selected when taking the survey can constitute the available options for the investor to find potential new investments for the portfolio, such that, in various embodiments, the impact objectives and/or issues of concern that the investor did not select as being important are not displayed as options for aligning the portfolio. In the illustrated example, the investor selected various impact preferences and issues of concern when completing the survey and selected climate solutions as the priority impact objective for the alignment analysis. Next, as shown in FIGS. 13 and 14 the user could specify the applicable operational and financial criteria for the analysis. Finally, FIG. 15 shows one example of the results or output of the search and ranking engine 38 according to various embodiments. Parts 2 and 3 of the screen shot of FIG. 15 show that climate solutions was the primary objective for the alignment analysis. Part 4 shows other investment alternatives (e.g., funds) in the universe of funds that the database 10 tracks, that better align with the selected impact objective, in this case climate solutions. The funds shown in Part 4 could be funds that are already in the investor's portfolio and/or funds that are not presently in the investor's portfolio. The columns at Part 1 of the chart shows how each of the displayed funds compares to the relevant benchmark for the primary impact objective (in this case climate solutions). The chart can also show how the funds perform relative to the relevant benchmark for other impact preferences, although preferably the primary objective is listed in the first column, as shown in FIG. 15, to facilitate the user's understanding of the data. Color coding can be used in the chart to show where the funds outperform the benchmark for the various impact objectives.

Figure 16:
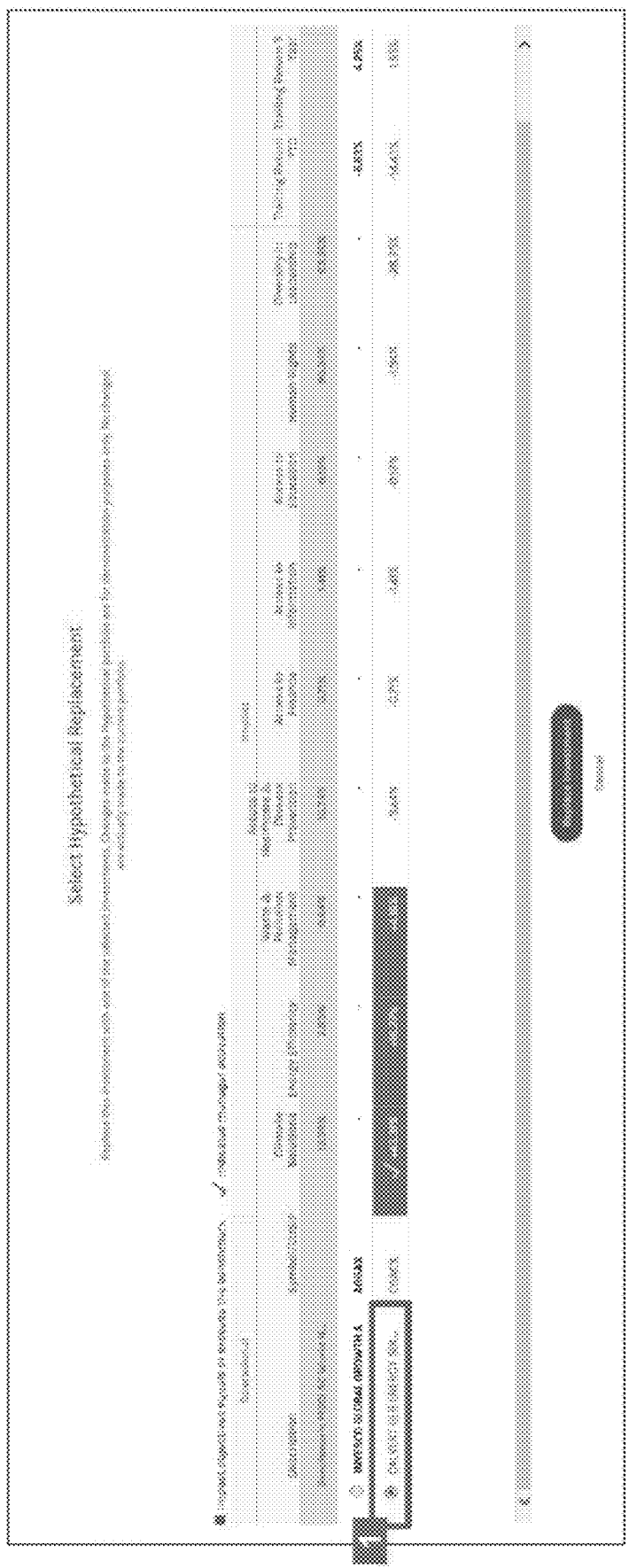
Figure 17:
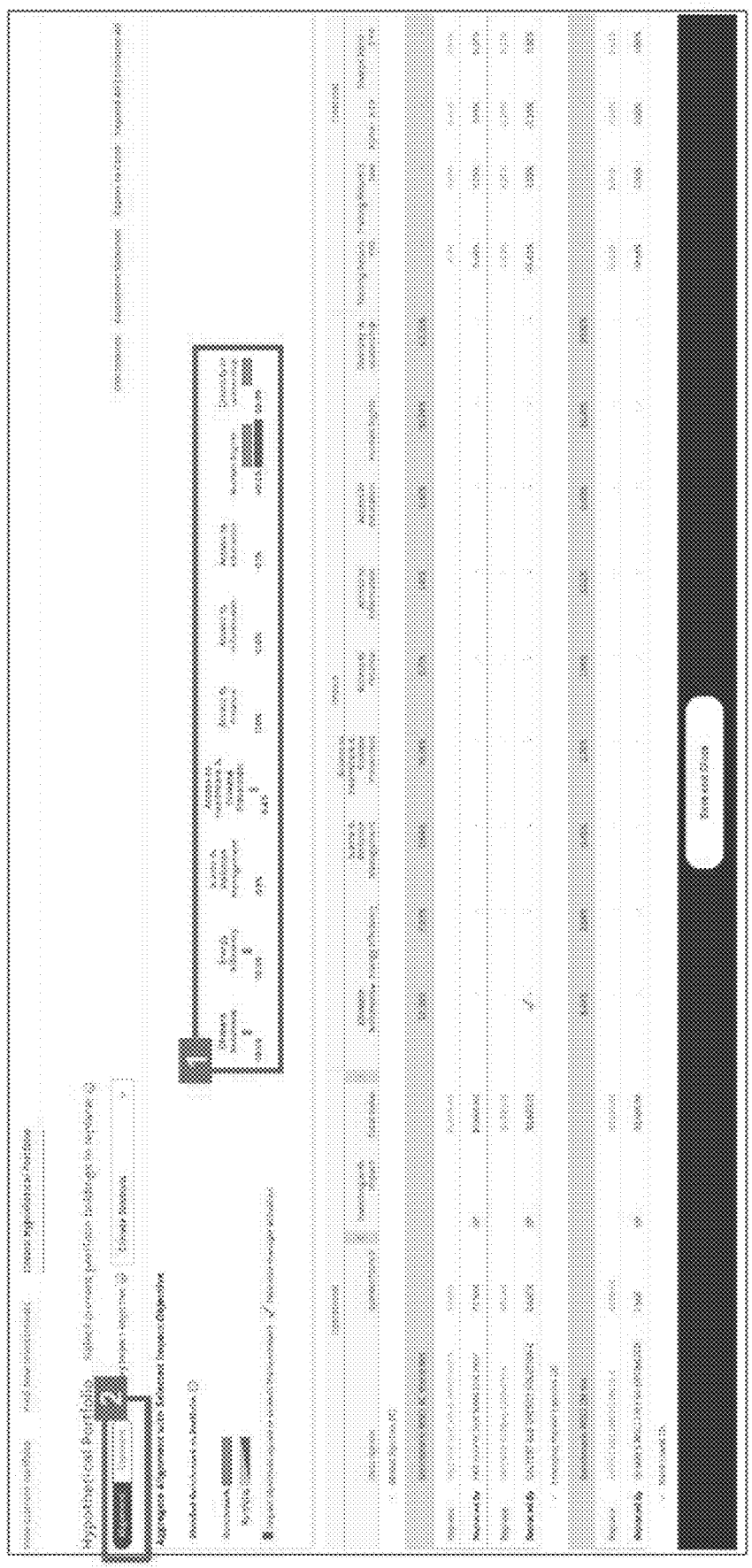

A user could select one or more of the displayed funds, as shown in the example of FIG. 15 (where the Calvert Global Energy Solutions Fund Class C is selected) and then select the "Create Hypothetical Portfolio" button in the bottom right to see how inclusion of the selected fund would impact the investor's portfolio. In the screen shot of FIG. 16, the user can select a fund currently in the investor's portfolio that is to be replaced in the hypothetical portfolio with the fund selected in FIG. 15. In this example, the Invesco Global Growth Fund Class A is selected to be replaced. The hypothetical portfolio analytics engine 40 would then determine the alignment of the hypothetical portfolio in terms of the investor's impact preferences. FIG. 17 is a screen shot showing the impact of the hypothetical portfolio as computed by the portfolio analytics engine 40. Part 1 can show the impact relative to the blended benchmark for various impact objectives. The data in Part 1 preferably is dynamic. That is, as the user selects different funds to be included and removed from the hypothetical portfolio, Part 1 is dynamically updated to shows the changes relative to the benchmark for the portfolio.

Figure 18:
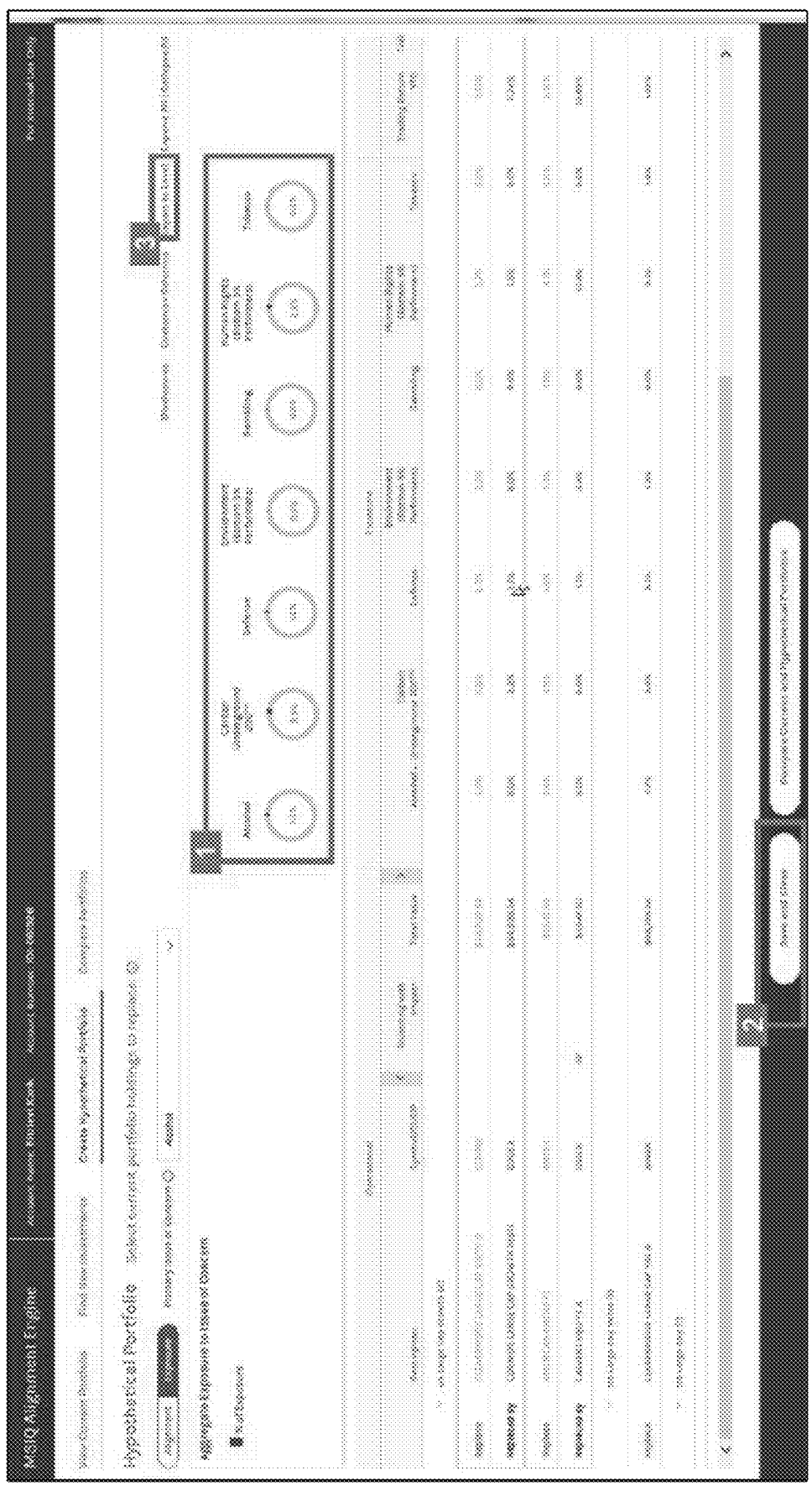

In Part 2 of FIG. 17 the user can toggle between alignment and exposure analyses. The hypothetical changes to the portfolio to improve performance on various impact objectives may improve or weaken exposure on the investor's selected issues of concern. Toggling to the exposure analysis, an example of which is shown in FIG. 18, shows such an analysis. Part 1 of FIG. 18 shows the hypothetical portfolio's exposure to the investor's selected issues of concern as a result of the hypothetical changes to the portfolio selected by the user.

Figure 19:
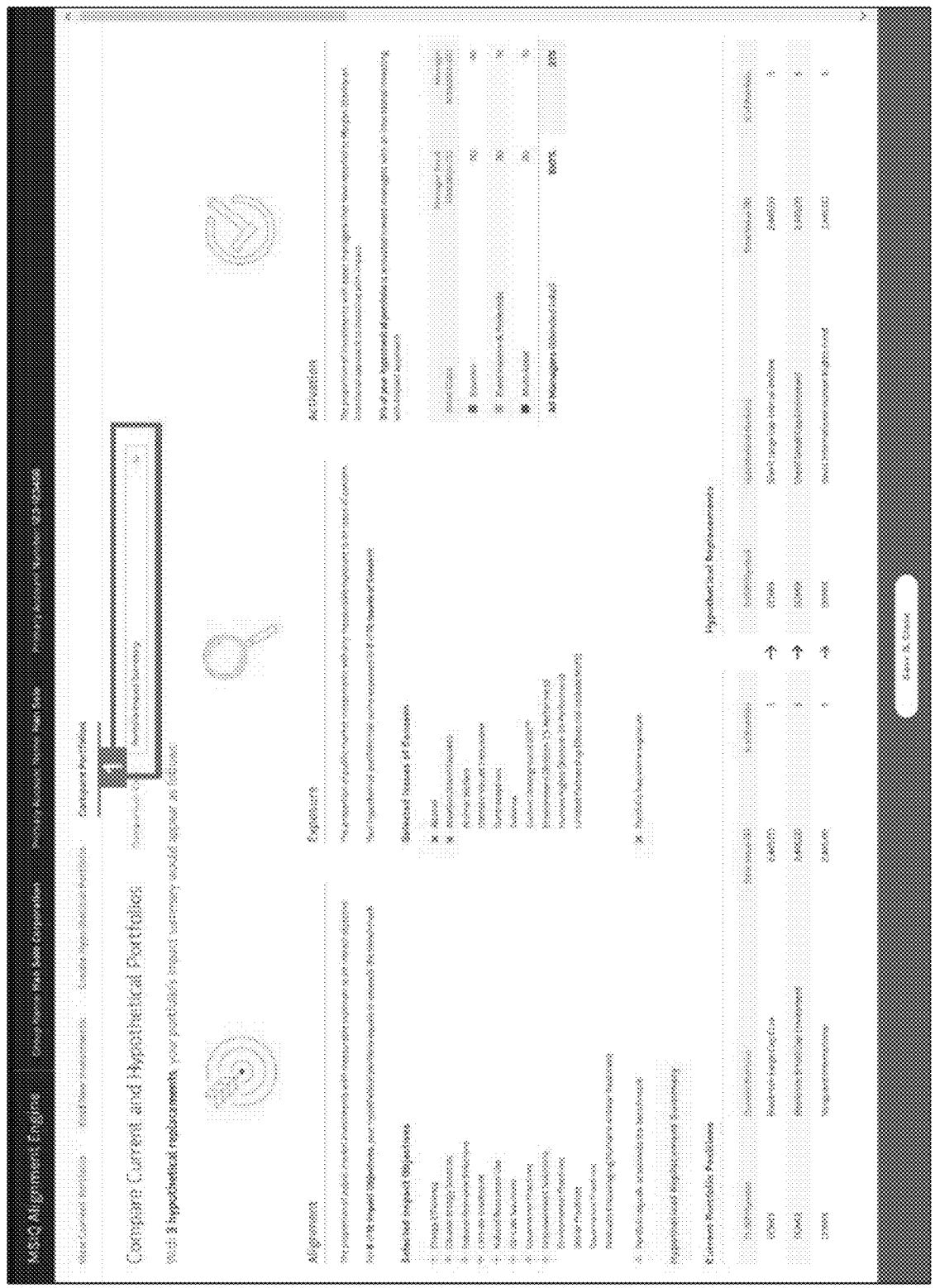
Figure 20:
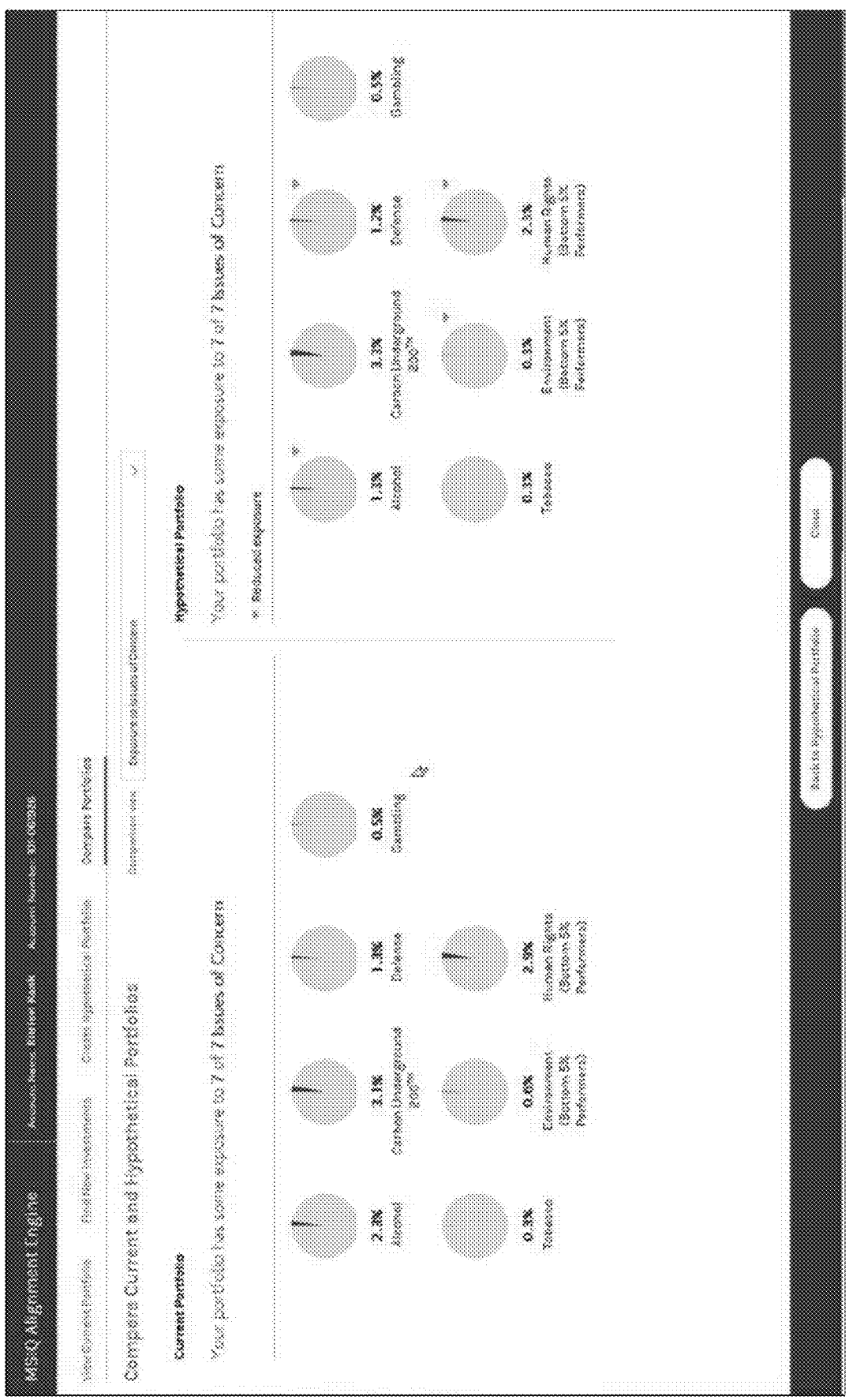

FIG. 2B, described above, summarized how the investor's portfolio compared to the relevant blended benchmark for the portfolio prior to any hypothetical changes to the portfolio. FIG. 19 is a corresponding summary for the hypothetical portfolio (note that the examples of FIG. 2B and FIG. 19 are for different portfolios and investors, so the selected impact preferences are different for each). The alignment section shows how the hypothetical portfolio compares to the benchmark for the investor's impact objectives; the exposure section shows how the hypothetical portfolio performs for the investor's identified issues of concern; and the activation section shows the percentage of the investor's portfolio, by market value, is activated toward managers with an intentional investing with impact approach. The bottom portion of FIG. 19 shows the fund-level changes the investor would need to make to implement the hypothetical portfolio from the current portfolio. The example screen shot of FIG. 20 shows the investor's exposure to the investor's issues of concern for the investor's current and hypothetical portfolios.

The computer system of FIG. 3 preferably is implemented with multiple computer devices (e.g., servers, mainframes, etc.) interconnected via one or more computer data networks (e.g., LANs, WANs, etc.). In various embodiments, the database system 10 receives fund data following each trading day since the holdings of the funds may change day to day. In that case, the ESG calculation engine 30 computes the ESG scores for the funds following each trading day to reflect the updated holdings of the funds so that when an investor performs the assessment and alignment process, the ESG fund data is already computed (i.e., pre-computed) to speed by the analysis. As mentioned previously, there could be one hundred or more ESG factors/impact preferences that are being assessed across tens of thousands of funds and hundreds of thousands of individual securities. The benchmark alignment engine 32 can compute the alignment for an investor's portfolio each time it is requested for an investor via the user interface (e.g., website or mobile app). Similarly, the investment alignment computer system.

The Investment Alignment Computer System 36 can compute the alignment for the investor's portfolio and generate the hypothetical portfolio each time it is requested for the investor via the user interface.

In various embodiments, the computer system of FIG. 3 may use application programming interfaces (APIs) to transfer data between various systems and engines. In various embodiments, the computer system uses Representational State Transfer (RESTful) web services and APIs. RESTful web services and API conform to the REST architectural style and provide interoperability between computer systems, such as the client discovery tool 9, the benchmark alignment engine 32 and the investment alignment computer system 36. Using a RESTful web service, requests for a system/engine of FIG. 3 made to a resource's URI of another system may elicit a response with a payload formatted in HTML, XML, JSON, or some other format. The response can confirm that some alteration has been made to the stored resource, and the response can provide hypertext links to other related resources or collections of resources. By using a stateless protocol and standard operations, RESTful systems provide fast performance, reliability, and the ability to grow by reusing components that can be managed and updated without affecting the system as a whole, even while it is running.

In the computer system of FIG. 3, for example, the client discovery tool 9 can share the client's survey results (impact preferences) with the benchmark alignment engine and the investment alignment computer system using RESTful APIs. Similarly, the investment alignment computer system can use RESTful APIs to communicate with the web server(s) 8 to display the results of the analysis by the investment alignment computer system for the user or investor on the websites hosted by the web server 8.

The various engines of the computer system of FIG. 3 may be implemented with one or more interconnected computer devices (e.g., servers, mainframes, etc.) that have one or more processors and software that, when executed by the processor(s) of the computer devices, configures the computer device to perform the various functions attributed to them herein. The processor(s) of the various engines and computer systems in FIG. 3 may be comprise CPU cores and/or GPU cores. GPU cores operate in parallel (e.g., a general-purpose GPU (GPGPU) pipeline) and, hence, can typically process data more efficiently that a collection of CPU cores, but all the cores of a GPU execute the same code at one time. The software executed by the processors may be stored in onboard memory and/or offboard memory. The onboard memory may comprise primary, volatile, and/or non-volatile storage (e.g., storage directly accessible by the processor cores). The offboard memory 4106 may comprise secondary, non-volatile storage (e.g., storage that is not directly accessible by the processor cores), such as ROM, HDDs, SSD, flash, etc.

The computer software may use a suitable computer programming language such as .NET, C, C++, or Python, and use conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

Unless specifically stated otherwise as apparent from the foregoing disclosure, it is appreciated that, throughout the foregoing disclosure, discussions using terms such as "processing," "computing," "calculating," "determining," or the like refer to the action and processes of a computer system (e.g., the computer system of FIG. 3 or similar electronic computing device) that manipulates and transforms data represented as physical (electronic) quantities within the computer system's registers and memories into other data similarly represented as physical quantities within the computer system memories or registers or other such information storage, transmission or display devices.

As is apparent based on the above description, it is clear that aspects of the present invention improve upon existing financial advisor reporting platforms. To the inventors' knowledge, existing financial advisor reporting platforms do not take into consideration an investor's unique impact preferences, assess an investor's account(s) with respect to those impact preferences, and/or allow an investor to develop a hypothetical portfolio that better aligns with the investor's impact preferences. Accordingly, various embodiments of the present invention solve the technical problem of computing how an investment portfolio aligns with an individual's unique set of impact preferences. Similar to understanding a portfolio's financial performance or risk metrics, embodiments of the present invention allow the user (e.g., financial advisor and/or investor) to understand the portfolio's social and environmental impact metrics across a uniquely defined set of preferences. As a result, the present invention can provide an in-depth and holistic client discovery process that discovers an investor's unique set of impact preferences across over one hundred or more possible preferences. The present invention can, in various embodiments, importantly solve the challenge of taking these hundreds of impact preferences and data points and allowing a financial advisor to distill down to the components most meaningful to each client. The present invention can also allow for the improvement on those social and environmental metrics by identifying hypothetical investment changes across each of the unique impact preferences determined by an investor.

In one general aspect, therefore, various embodiments of the present invention are directed to computer-based systems and methods for generating a graphical display that displays how an investor's investment holdings and account perform in terms of the investor's unique social and environmental impact preferences. In various embodiments, the system comprises a database system 10 that comprises data indicative of securities held by a plurality of investment funds and accounts and ESG ratings for the securities. The system also comprises a computer system 32, 33, 36 that is in communication with the database system 10. The computer system is programmed to capture selections of the investor's impact preferences via an online survey and compute an alignment of the investor's investment holdings and account for the investor's selected impact preferences. The alignment is computed using the ESG ratings for the securities that comprise the investor's account. The computer system is also configured to display graphically an analysis that comprises the alignment of the investor's investment holdings and account for the investor's selected impact preferences.

A method for generating a graphical display that displays how an investor's investment holdings and account perform in terms of the investor's unique social and environmental impact preferences comprises, according to various embodiments, the step of storing, in a database system 10, the data indicative of securities held by a plurality of investment funds and accounts, and the ESG ratings for the securities. The method also comprises the steps of capturing, by a computer system that is in communication with the database system, selections of the investor's impact preferences via an online survey and computing, by the computer system, an alignment of the investor's investment holdings and account for the investor's selected impact preferences. The alignment is computed using the ESG ratings for the securities that comprise the investor's account. The method also comprises the step of displaying graphically an analysis that comprises the alignment of the investor's investment holdings and account for the investor's selected impact preferences.

In various implementations, the computer system is further programmed to determine one or more appropriate benchmarks for the investor's account and compute an alignment of the one or more appropriate benchmarks for the investor's selected impact preferences, where the alignment of the one or more benchmarks is computed using the ESG ratings for the securities that comprise the one or more appropriate benchmarks. In that case, the computer system can also be programmed to include in the graphically displayed analysis the alignment of the one or more appropriate benchmarks for the investor's account for the investor's selected impact preferences. The computer system can be programmed to determine the one or more appropriate benchmarks for the investor's account based on a market-value weighted proportion of individual benchmarks assigned to each individual investment held in the investor's account.

In various implementations, the investor's impact preferences can comprise an impact solution, such as climate solutions, energy efficiency, natural resource solutions, affordable housing, access to food and nutrition, and/or empowerment solutions. The investor's impact preferences can also comprise a sustainable corporate practice, such as environmental practices, alternative energy use, social practices, product safety record, governance practices, employee treatment and/or gender diversity in leadership. The investor's impact preferences can further comprise an issue of concern for investments, in which case the computer system can be further programmed to compute an exposure of the investor's account to the issue of concern and the graphically displayed analysis can comprises the exposure of the investor's account to the issue of concern. The issue of concern can comprise an issue of concern such as alcohol, gambling, tobacco and weapons.

In various implementations, the computer system is further programmed to search for possible investments for the investor that better align with the investors' impact preferences and generate a rank-ordered list of investments to be included in a hypothetical portfolio for the investor's account based on the search for possible investments for the investor that better align with the investors' impact preferences. In that case, the computer system can be further programmed to include in the graphically displayed analysis information about the hypothetical portfolio. The information about the hypothetical portfolio in the graphically displayed analysis can comprise a summary of at least one investment replacement for the investor's account to realize the hypothetical portfolio and a summary of how the hypothetical portfolio aligns with the investors' impact preferences.

In various implementations, the computer system is further programmed to compute the alignment for the investor's account for the investor's impact preferences in real-time after the investor's impact preferences are captured via an online survey and in response to a request received by the computer system to compute the alignment. Also, the database system may ingest the data indicative of the securities held by the plurality of investment funds and the ESG ratings for the securities via SSH File Transfer Protocol prior to calculation of the alignment.

In various implementations, the database system further comprises data indicative of asset managers for funds that have reported an intentional approach to investing with impact. In that case, the computer system can be further configured to compute and graphically display a proportion of investor's investment account that is activated toward asset managers with an intentional approach to investing with impact.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for generating a graphical display that displays how an investor's investment holdings and account perform in terms of the investor's unique social and/or environmental impact preferences, the computer system comprising:
 a database system that comprises data indicative of:
  securities held by a plurality of investment funds and accounts; and
  environmental, social and/or governance (ESG) ratings for the securities,
  wherein the database system periodically ingests, via a data feed, the data indicative of the securities held by the plurality of investment funds and the ESG ratings for the securities;
 a computer system in communication with the database system, wherein the computer system is programmed to:
  capture selections of the investor's impact preferences via an online survey; and
  in real-time after capturing the selections:
   compute, by an alignment engine, an alignment of the investor's investment holdings and account for the investor's selected impact preferences, wherein the alignment is computed using the ESG ratings for the securities that comprise the investor's account, wherein the alignment engine receives the captured impact preferences of the investor via an API; and
   display graphically, by a web server, an analysis that comprises the alignment of the investor's investment holdings and account for the investor's selected impact preferences, wherein the web server receives data for the analysis from the database system via an API;
  wherein the computer system is further programmed to, in response to input by a user in response to the graphical display of the analysis that comprises the alignment:
   search for possible investments for the investor based on the investor's' impact preferences;
   generate a rank-ordered list of investments to be included in a hypothetical portfolio for the investor's account based on the search for possible investments for the investor that better align with the investor's impact preferences; and
   include in the graphically displayed analysis information about the hypothetical portfolio, wherein the information about the hypothetical portfolio in the graphically displayed analysis comprises:
    a summary of at least one investment replacement for the investor's account to create the hypothetical portfolio; and
    a summary of how the hypothetical portfolio aligns with the investor's impact preferences.

2. The system of claim 1, wherein the computer system is further programmed to:
- determine one or more appropriate benchmarks for the investor's account;
- compute an alignment of the one or more appropriate benchmarks for the investor's selected impact preferences, wherein the alignment of the one or more benchmarks is computed using the ESG ratings for the securities that comprise the one or more appropriate benchmarks; and
- include in the graphically displayed analysis the alignment of the one or more appropriate benchmarks for the investor's account for the investor's selected impact preferences.

3. The system of claim 1, wherein the investor's impact preferences comprise an impact solution.

4. The system of claim 3, wherein the impact solution comprises an impact solution selected from the group consisting of climate solutions, energy efficiency, natural resource solutions, affordable housing, access to food and nutrition, and empowerment solutions.

5. The system of claim 1, wherein the investor's impact preferences comprise a sustainable corporate practice.

6. The system of claim 5, wherein the sustainable corporate practice comprises a sustainable corporate practice selected from the group consisting of environmental practices, alternative energy use, social practices, product safety record, governance practices, employee treatment and gender diversity in leadership.

7. The system of claim 1, wherein:
- the investor's impact preferences further comprise an issue of concern for investments;
- the computer system is further programmed to compute an exposure of the investor's account to the issue of concern; and
- the graphically displayed analysis comprises the exposure of the investor's account to the issue of concern.

8. The system of claim 7, wherein the issue of concern comprises the issue of concern selected from the group consisting of alcohol, gambling, tobacco and weapons.

9. The system of claim 1, wherein the investor's impact preferences captured via the online survey comprise:
- an impact theme that is important to the investor;
- an impact solution that is important to the investor;
- a sustainable corporate practice that is important to the investor;
- a sustainable development goal that is important to the investor;
- a target population that is important to the investor;
- a faith-based approach that is important to the investor; and/or
- an issue of concern that is important to the investor.

10. The system of claim 2, wherein the computer system is programmed to determine the one or more appropriate benchmarks for the investor's account based on a market-value weighted proportion of individual benchmarks assigned to each individual investment held in the investor's account.

11. The system of claim 1, wherein the database system ingests the data indicative of the securities held by the plurality of investment funds and the ESG ratings for the securities via a SSH File Transfer Protocol prior to calculation of the alignment.

12. The system of claim 1, wherein:
- the database system further comprises data indicative of asset managers for funds that have reported an intentional approach to investing with impact; and
- the computer system is further configured to compute and graphically display a proportion of investor's investment account that is activated toward asset managers with an intentional approach to investing with impact.

13. A computer-implemented method for generating a graphical display that displays how an investor's investment holdings and account perform in terms of the investor's unique social and/or environmental impact preferences, the method comprising:
- storing, in a database system, data indicative of:
  - securities held by a plurality of investment funds and accounts; and
  - environmental, social and/or governance (ESG) ratings for the securities,
  - wherein storing the data comprises periodically ingesting, via a data feed, the data indicative of the securities held by the plurality of investment funds and the ESG ratings for the securities;
- capturing, by a computer system that is in communication with the database system, selections of the investor's impact preferences via an online survey; and
- in real-time after capturing the selections:
  - computing, by an alignment engine of the computer system, an alignment of the investor's investment holdings and account for the investor's selected impact preferences, wherein the alignment is computed using the ESG ratings for the securities that comprise the investor's account, wherein the alignment engine receives the captured impact preferences of the investor via an API; and
  - displaying graphically, by a web server, an analysis that comprises the alignment of the investor's investment holdings and account for the investor's selected impact preferences, wherein the web server receives data for the analysis from the database system via an API,
- wherein the method further comprises, in response to input by a user in response to the graphical display of the analysis that comprises the alignment:
  - searching, by the computer system, for possible investments for the investor based on the investor's' impact preferences;
  - generating, by the computer system, a rank-ordered list of investments to be included in a hypothetical portfolio for the investor's account based on the search for possible investments for the investor that better align with the investor's impact preferences; and
  - including, by the computer system, in the graphically displayed analysis information about the hypothetical portfolio, wherein the information about the hypothetical portfolio in the graphically displayed analysis comprises:
    - a summary of at least one investment replacement for the investor's account to create the hypothetical portfolio; and
    - a summary of how the hypothetical portfolio aligns with the investor's impact preferences.

14. The method of claim 13, wherein the method further comprises:
- determining, by the computer system, one or more appropriate benchmarks for the investor's account;
- computing, by the computer system, an alignment of the one or more appropriate benchmarks for the investor's selected impact preferences, wherein the alignment of the one or more appropriate benchmarks is computed using the ESG ratings for the securities that comprise the one or more appropriate benchmarks; and including, by the computer system, in the graphically displayed analysis the alignment of the one or more appropriate benchmarks for the investor's account for the investor's selected impact preferences.

15. The method of claim 13, wherein:

the investor's impact preferences further comprise an issue of concern for investments;

the method further comprises computing, by the computer system, an exposure of the investor's account to the issue of concern; and the graphically displayed analysis further comprises the exposure of the investor's account to the issue of concern.

16. The method of claim 14, wherein determining the one or more appropriate benchmarks for the investor's account comprises determining the one or more appropriate benchmarks based on a market-value weighted proportion of individual benchmarks assigned to each individual investment held in the investor's account.

17. The computer method of claim 13, wherein ingesting the data indicative of the securities held by the plurality of investment funds and accounts and the ESG ratings for the securities comprises ingesting the data via a SSH File Transfer Protocol prior to calculation of the alignment.

* * * * *